United States Patent [19]
Hamada et al.

[11] Patent Number: 5,800,942
[45] Date of Patent: Sep. 1, 1998

[54] STORAGE BATTERY WITH VENTILATION SYSTEM

[75] Inventors: Shinji Hamada, Hirakata; Shuhei Marukawa, Moriguchi; Hiroshi Inoue, Neyagawa; Munehisa Ikoma, Nara, all of Japan

[73] Assignee: Matsushita Electric Industrial Co., Ltd., Osaka, Japan

[21] Appl. No.: 736,453

[22] Filed: Oct. 24, 1996

[30] Foreign Application Priority Data

Oct. 24, 1995 [JP] Japan ................ 7-275337

[51] Int. Cl.⁶ ................ H01M 2/04
[52] U.S. Cl. ................ 429/148; 429/120; 429/59; 429/175; 429/177
[58] Field of Search ................ 429/175, 120, 429/148, 156, 158, 177, 160, 83, 89, 59

[56] References Cited

U.S. PATENT DOCUMENTS

| | | | |
|---|---|---|---|
| 2,186,148 | 1/1940 | Raney | 429/160 |
| 3,457,119 | 7/1969 | Tench | 136/170 |
| 3,767,468 | 10/1973 | Schusler | 429/120 |
| 3,943,007 | 3/1976 | Lebrun | 429/120 |
| 3,961,988 | 6/1976 | Andreoff | 136/181 |
| 4,107,402 | 8/1978 | Dougherty et al. | 429/148 |
| 4,206,273 | 6/1980 | Mandill | 429/65 |
| 4,957,829 | 9/1990 | Holl | 429/99 |
| 5,281,492 | 1/1994 | Lin | 429/177 |
| 5,585,204 | 12/1996 | Oshida et al. | 439/120 |

FOREIGN PATENT DOCUMENTS

| | | |
|---|---|---|
| 0 533 317 | 6/1992 | European Pat. Off. . |
| 0 599 137 | 6/1994 | European Pat. Off. . |
| 482 214 | 3/1917 | France . |
| 48-63221 | 11/1946 | Japan . |
| 48-103820 | 3/1947 | Japan . |
| 58-14672 | 7/1956 | Japan . |
| 59-123966 | 8/1984 | Japan . |
| 60-187456 | 12/1985 | Japan . |
| 3-32364 | 3/1991 | Japan . |
| 3-291867 | 12/1991 | Japan . |
| 5-159755 | 6/1993 | Japan . |
| 6-150963 | 5/1994 | Japan . |
| 1059228 | 2/1967 | United Kingdom . |
| 2 061 599 | 5/1981 | United Kingdom . |

*Primary Examiner*—Kathryn L. Gorgos
*Assistant Examiner*—Carol Chaney
*Attorney, Agent, or Firm*—McDermott, Will & Emery

[57] ABSTRACT

A storage battery assembly includes a plurality of electrochemical cells bundled in side-by-side fashion together in a row and electrically connected in series with each other by means of generally elongated electroconductive connecting pieces each connecting a pole terminal of a pair of pole terminals of an electrochemical cell with another pole terminal of a pair of pole terminals of a next adjoining electrochemical cell. Each electrochemical cell includes a generally rectangular box-like electrolyte vessel having an opening, an electrode structure accommodated within the electrolyte vessel and including positive electrode plates and negative electrode plates, a quantity of electrolyte accommodated within the electrolyte vessel, a top lid enclosing the opening of the electrolyte vessel, and pole terminals protruding outwardly from the respective top lid. An insulating cover made of synthetic resin and having a plurality of vent perforations defined therein is provided on the storage battery assembly so as to cover respective tops of the electrochemical cells with the vent perforations positioned substantially above the connecting pieces.

14 Claims, 13 Drawing Sheets

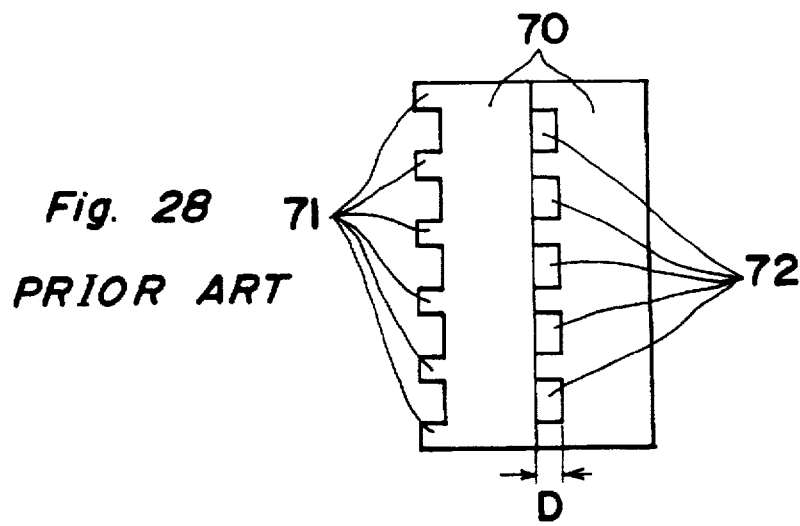
Fig. 28 PRIOR ART
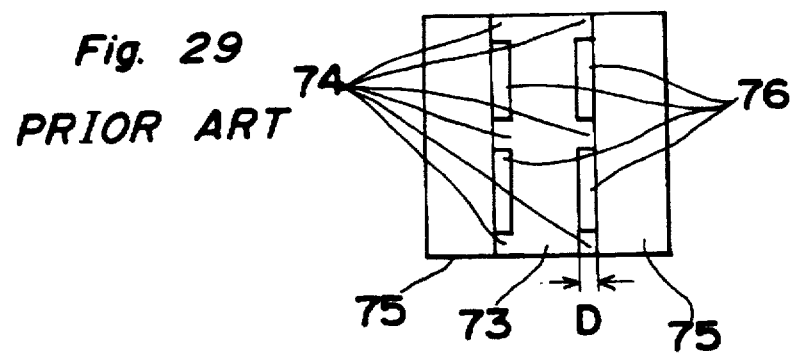
Fig. 29 PRIOR ART
Fig. 30 PRIOR ART
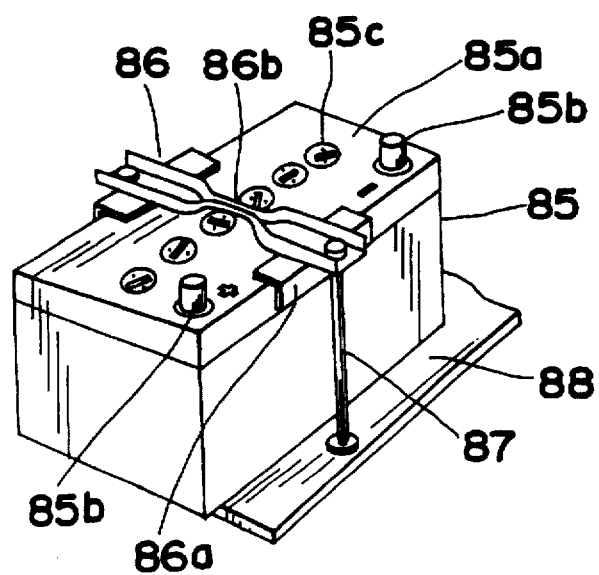

STORAGE BATTERY WITH VENTILATION SYSTEM

BACKGROUND OF THE INVENTION

1. (Field of the Invention)

The present invention generally relates to an alkaline storage battery comprising a plurality of electrochemical cells juxtaposed together and, more particularly, to an improvement in ventilation and insulation in the alkaline storage battery.

2. (Description of the Prior Art)

A sealed alkaline storage battery of a type wherein negative electrode plates are made of hydrogen absorbent alloy as a principal component or cadmium has gained a widespread because of its excellent charge-discharge characteristics and ease of handling. Since the conventional alkaline storage battery is generally of a sealed design such that oxygen gas generated from positive electrode plates during an excessive charging can react with the negative electrode plates to allow the oxygen gas to be absorbed by the negative electrode plates, the storage battery is susceptible to increase in temperature by heat evolved as a result of the reaction during the charging and, particularly, during the excessive charging. It is well known that increase in temperature is more considerable in the nickel-hydrogen storage battery, in which hydrogen absorbent alloy is used, than in the nickel-cadmium storage battery in which the negative electrode plates are made of cadmium.

Once the storage battery is heated, the charge-discharge efficiency, particularly the charge efficiency, of the storage battery tends to be lowered to such an extent that the storage battery will no longer exhibit its intended performance. In contrast thereto, the conventional small-sized cylindrical alkaline storage battery has an excellent capability of dissipating heat to outside of the storage battery and is therefore substantially free from such problem as discussed above.

With the field of use of the alkaline storage battery expanding, needs has arisen of a medium-to-large capacity, say, a few tens Ah to 300 Ah, of the alkaline storage battery. The larger the capacity of the alkaline storage battery, the more manifest the problem associated with the heat generated in the alkaline storage battery. In other words, the storage battery of a relatively large capacity tends to evolve a relatively large amount of heat and, therefore, if the storage battery is incapable of dissipating the heat to the outside efficiently, the temperature of the storage battery will undesirably increase to such an extent as to result in reduction in capacity and performance.

In the case of the storage battery assembly comprising a plurality of, for example, ten, storage batteries each of a medium-to-large capacity discussed above which are bundled together in a row, or in a system in which a plurality of such storage battery assemblies are juxtaposed, the individual storage batteries tends to exhibit a different rate of increase in temperature depending on the position, accompanied by a bias in discharge capacity. Where each of the storage batteries is a nickel-hydrogen storage battery, a gas and/or an electrolyte tends to leak through a safety vent as a result of increase in internal pressure, accompanied by degradation of the batteries. This in turn brings about reduction in performance and lifetime of the battery system as a whole.

Cooling of a battery assembly in which a plurality of electrochemical cells, i.e., storage batteries are accommodated within a casing is accomplished in numerous ways. For example, the Japanese Laid-open Utility Model Publication No. 60-187456, published in 1985, discloses the use of the casing having a double walled bottom with a hollow defined therein for passage of air used to facilitate heat dissipation from a portion of the battery wall. The Japanese Laid-open Utility Model Publication No. 48-103820, published in 1973, discloses an air-cooling of the bottom of the casing. The Japanese Laid-open Utility Model Publication No. 48-63221, published in 1973, discloses the use of a corrugated plate for the side and bottom walls of the casing to thereby increase the area of heat dissipating surfaces.

The Japanese Laid-open Utility Model Publication No.58-14672, published in 1983, discloses the use of a hollow intermediate plate interposed between the neighboring electrochemical cells and having a hollow through which air flows to cool the walls of the electrochemical cells, and the Japanese Laid-open Utility Model Publication No. 59-123966, published in 1984, discloses the use of a porous body interposed between the neighboring electrochemical cells, accommodated within the casing, for a water cooling system.

Of the various known storage battery assemblies in which the ventilating system is employed, one known example is shown in FIGS. 26 and 27 in which the storage battery assembly for use as an electric power source in a forklift employs the casing having the double-walled bottom designed to exhibit a relatively high head dissipating capability. Referring to FIGS. 26 and 27 showing the storage battery assembly schematically in a top plan view and a transverse sectional view, respectively, the storage battery assembly includes a generally rectangular box-like casing 62 having a double-walled bottom defined by an upper bottom wall 61 and an outer bottom wall 67. The storage batteries 60 are accommodated within the casing 62 resting on the upper bottom wall 61 and are electrically connected in series with each other by means of connecting pieces 63 to thereby complete the storage battery assembly 64. As shown therein, the storage batteries 60 have generally rounded corners and are arranged generally in a matrix pattern such that, in the assembled condition, a gap 65 that extends heightwise of each storage battery and transverse to the bottom wall is defined at a location where every four of the storage batteries 60 are gathered.

The upper bottom wall 61 has vent holes 66 defined therein in alignment with the gaps 65 so that, when a stream of air is introduced from a blower 69 into the hollow between the upper and lower bottom walls 61 and 67 through an inlet duct 68, the air can flow upwardly through the vent holes 66 and then through the gaps 65 in a direction shown by arrows to cool corner regions of the storage batteries 60. See the Japanese Laid-open Utility Model Publication No. 60-187456.

The Japanese Laid-open Patent Publication No. 5-159755, published in 1993, discloses a method of accommodating and connecting within a container, a plurality of monoblock-type maintenance-free batteries each comprised of a monoblock of a plurality of electrochemical cells for use as an electric power source for an electric car. According to this publication, each electrochemical cell has one side surface formed with projections and the opposite side surface formed with grooves and dovetail grooves to facilitate side-by-side connection of every neighboring storage batteries. When the storage batteries are so connected, a gap is formed between the neighboring storage batteries for the flow of a cooling air supplied by a blower. Implement of this known method disclosed in this Publication No. 5-159755 requires the use of the storage batteries specially designed therefor and is therefore limited in use.

In the case of the storage battery assembly comprising the alkaline storage batteries of the medium-to-large capacity, particularly the nickel-hydrogen storage batteries employing the hydrogen absorbent alloy for the negative electrode plates, the amount of heat evolved in the storage battery assembly is relatively high as hereinbefore discussed. Accordingly, employment of such a forced air cooling system as described above would result in an insufficient dissipation of heat from the storage battery assembly, accompanied by a considerable difference in local temperature which would be created from one storage battery to another depending on the position of the storage batteries. While the use of a water-cooled container or casing is effective to facilitate heat exchange, the apparatus utilizing the storage battery assembly would be no longer mobile or insulation between the neighboring storage batteries would pose another problem.

So far as applicable to the storage battery system (the storage battery assembly) in which the plural electrochemical cells tending to emit a relatively large amount of heat during charging such as the previously discussed sealed nickel-hydrogen storage batteries, are juxtaposed, numerous cooling methods have hitherto been suggested. For example, the use of a vent space of a predetermined size for the flow of air between the neighboring electrochemical cells is suggested. Another attempt include the use of grooves in outer surfaces of a electrolyte vessel of each electrochemical cell so as to extend from top to bottom of each electrochemical cell for the flow of heat removed from the neighboring electrochemical cells.

A further suggested cooling method includes disposition of the plural electrochemical cells within a container in spaced relation to each other. In this suggested method, pole terminals of the associated electrochemical cells which are exposed outside of the container through a top lid are externally connected with each other and, on the other hand, a vent hole is formed in one of the opposite side walls of the container whereas the other of the opposite side walls of the container is provided with a device for forcibly supplying a cooled air into the spaces between the neighboring electrochemical cells. A still further suggested method includes the use of recesses and projections on one or both of opposite side walls of the vessel, wherein the value K, which is the product of the width of a group of the electrode plates multiplied by the thickness thereof, is limited within a predetermined range and, on the other hand, the relationship between the width D of the space between the neighboring electrochemical cells and the thickness W of the electrode plate group and the amount of the electrolyte employed are controlled to increase the efficiency of heat exchange even though the space has a relatively small width, the capability of heat being dissipated during charging being further increased by forcibly supplying air from an air supply device into the spaces. See the Japanese Laid-open Patent Publications No. 3-291867 and No. 6-150963, published in 1991 and 1994, respectively.

FIGS. 28 and 29 illustrates two examples in which the space is employed between the neighboring electrochemical cells. The storage battery shown in a fragmentary top plan view in FIG. 28 includes a plurality of, for example, two, electrochemical cells 70 each including an electrolyte vessel having one of the opposite side walls formed with a plurality of longitudinal parallel ribs 71 which, when the electrochemical cells 70 are juxtaposed in contact with each other, define a corresponding number of longitudinal spaces 72 for the passage of a cooling air therethrough.

In the example shown in FIG. 29, one of the electrochemical cells 73 which intervene between the electrochemical cells 75 has its electrolyte vessel formed with respective sets of longitudinal parallel ribs 74 so that, when the electrochemical cells 73 and 75 are assembled together, the longitudinal parallel ribs 74 of each set define vent spaces 76 in cooperation with the confronting surface of the next adjacent electrochemical cell 75. Provided that the value K, that is, the product of the width L of the electrode plate group multiplied by the thickness W thereof is within the range of 10 to 100, the width D of each space is considered sufficient if it satisfies the following relationship, to thereby achieve an efficient heat dissipation even though the space has a width smaller than that in the example shown in FIG. 18:

$$0.02 \leq D/W \leq 0.3$$

As a method of fixedly mounting the storage battery assembly on a support structure installed in an appliance that requires the use of such storage battery assembly, in the case of lead storage batteries, a monoblock storage battery assembly is most often used in which a monoblock electrolyte vessel, the interior of which is divided into six or twelve chambers by partition walls and in which the electrochemical cells are connected together through inner leads extending through the partition walls with only positive and negative pole terminals exposed to the outside through a top lid as shown in FIG. 30.

Referring to FIG. 30, reference numeral 85 represents a monoblock 12-Volt lead storage battery assembly comprised of, for example, six electrochemical cells and having a top lid 85a fusion-bonded to top edges of the electrolyte vessel. The top lid 85a has only positive and negative pole terminals 85b fixedly mounted thereon and exposed to the outside and also has a plurality of electrolyte injection ports 85c defined therein in a row. This lead storage battery 85 is mounted on a support structure 88 and is fixed in position by means of cross bar 86b having angle pieces 86a adjacent its opposite ends for engagement with respective side corners of the top lid 85a, in combination with bolts 87 each having opposite ends engaged with the cross bar 86b and the support structure 88.

In contrast to the lead storage battery assembly, the alkaline storage battery assembly comprises a plurality of, for example, generally five to ten, storage batteries which are accommodated within a container in a row. Alternatively, as disclosed in the Japanese Laid-open Utility Model Publication No. 3-32364, published in 1991, the alkaline storage battery assembly comprises a plurality of storage batteries integrated together by the use of assembling members and having respective pole terminals connected in series with each other by means of cell-to-cell clamp bands 99. Accordingly, the fixing method shown in FIG. 13 and applied to the monoblock lead storage battery assembly cannot be employed for securing the alkaline storage battery assembly to the support structure and, therefore, such a fixing method as shown in FIGS. 31 and 32 is generally employed.

Referring now to FIGS. 31 and 32, the storage batteries 90 are assembled together in a juxtaposed fashion by means of end plates 92 which are clamped together by means of side clamp bands 99 to provide a complete storage battery assembly 91. The complete storage battery assembly 91 is fixedly mounted on a support structure 94 by means of generally L-shaped fixtures 93 each having an upright arm secured to the corresponding end plate 92 and a transverse arm secured to the support structure 94. Alternatively, instead of the L-shaped fixtures 93, fixtures 97 of a shape similar to the shape of an inverted figure of "L" may be made as shown by the phantom lines in FIG. 31, in which case the upright and transverse arms of each fixture 97 are secured to the corresponding end plate 92 and the support structure 94, respectively.

So far as the ventilating system is concerned wherein a cooling air is passed through the spaces defined between the electrochemical cells to forcibly cool the electrolyte vessels externally such as disclosed in the Japanese Laid-open Patent Publication No. 6-150963, it has been found that when and so long as the medium-to-large capacity alkaline storage battery, particularly the sealed nickel-hydrogen storage battery utilizing the hydrogen absorbent allow for the negative electrode plates, are cyclically charged and discharged with an electric current of about 0.1 to 0.2 CA (wherein C represents a specific value of the rated capacity of the storage battery and A represents an amperage) under an ambient temperature of 30° to 35° C. which is considered an acceptable operating temperature for the alkaline storage battery, the temperature of the storage battery could be maintained at a temperature lower by 5° C. or higher if no air is supplied through the spaces, or by about 15° to 20° C. if air is supplied through the spaces at 3 to 3 mS, than the conventional storage battery in which no space is employed between the neighboring cells.

However, in a new application such as an electric car or as a security power source for a heavy-duty machinery, about 50 to 300 sealed alkaline storage batteries of about 100 Ah are employed as electrochemical cells. However, needs have arisen for the storage battery system employing the storage battery assembly comprising generally 5 to 10 electrochemical cells assembled together as shown in FIG. 31 and capable of being installed in a limited space available in the machinery without sacrificing the safety factor and also capable of exhibiting an intended performance while withstanding against a rapid charging and a discharge of a considerable amount of electric current. As shown in FIG. 31, in the complete storage battery assembly 91, the pole terminals 95 exposed at respective upper surfaces of the top lids of the electrochemical cells are electrically connected together by means of the connecting pieces 96 having an excellent electroconductivity and having its opposite ends secured thereto by means of screws. Where 10 to 30 sets of such storage battery assemblies are to be installed within such a limited space as discussed above, the connecting pieces 96 and the pole terminals 95 are required to be covered by a common cap or individual caps, made of synthetic rubber, thermoplastic elastomer or flexible synthetic resin by the use of any suitable molding technique, in order to avoid any possible short-circuitting and/or any possible electric shock.

On the other hand, since the pole terminals 95 and the connecting pieces 96 are made of material having an excellent electroconductivity and also having an excellent thermal conductivity, they serves to facilitate dissipation of heat, evolved within the storage battery, to the atmosphere through leads connected with the electrode plates and have, under the generally accepted operating condition of the storage battery, contributed to suppression of increase in temperature of the storage battery.

However, under the condition in which the electric car is operated, it has often been found that the electric current flows at a rate of 0.3 to 1 CA and, specifically, at a rate of 30 to 100 A in the case of the storage battery of 100 Ah capacity, during the charging, along with a relatively high discharge rate of, for example, 50 to 200 A or higher.

Accordingly, even though both of the connecting pieces and the pole terminals have been designed to have a low electric resistance, the connecting pieces, the pole terminals and junctions therebetween pose a noticeable contact resistance and tend to evolve a relatively large amount of heat. In addition, the use of the insulating cap or caps concealing the connecting pieces and the pole terminals tend to hamper a smooth emission of heat to the ambient atmosphere and, accordingly, the forced cooling system is in most cases incapable of achieving its intended purpose. Heating of the connecting pieces, the pole terminals and the junctions therebetween even though they are forcibly cooled involves a considerable increase in temperature and, for this reason, the efficiency of removal of the heat evolved within the storage battery is lowered, accompanied by a tendency of the storage battery to have a further increased temperature. Although this tendency may be lessened more in the nickel-cadmium storage battery than in the nickel-hydrogen storage battery during the charging, it cannot be negligible when the discharge is taken into consideration.

Reduction of the head dissipating capability in turn results in reduction in discharge capacity induced by reduction in charging efficiency and also reduction in cycle lifetime. In addition, the cap or caps are apt to be separated from the right position under the influence of vibration such as occurring during transportation.

When it comes to the mounting of the storage battery on the support structure, the storage battery assembly is generally mounted on the support structure in a manner as shown in and discussed with reference to FIGS. 31 and 32, that is, by the use of the L-shaped fixtures 94 secured to the associated end plates 92 that are used to clamp the storage batteries 90 together to complete the storage battery assembly 91. However, where the spaces 97 are formed between the neighboring storage batteries by the use of the ribs or projections such as disclosed in, for example, the Japanese Laid-open Patent Publication No. 6-150963, the storage battery assembly 91 must have open at the bottom thereof in order for the air to be forcibly supplied in the direction shown by the arrow in FIG. 31. For this reason, as shown in FIG. 32, the support structure 94 for the support of the storage battery assembly 91 thereon must have either a cutout defined at a location which would be occupied by the bottom of the storage battery assembly 91 or be supported from below by the use of angle members each designed to receive a lower end portion of each storage battery.

It has, however, been found that the fixing method shown in FIGS. 31 and 32 has a problem in that when the storage battery assembly 91 is subjected to vibration, shock and/or acceleration, one or more intermediate members of the storage batteries tend to be displaced up and down and/or sideways, accompanied by loosening of the junctions between the connecting pieces 96 and the pole terminals 95 which in turn result in increase of resistance. Consequent upon increase of the resistance at the junctions, not only is the load voltage reduced, but an abnormal heating takes place at the junctions to such an extent that the storage battery assembly 91 may be deformed along with reduction in performance.

For securing the storage battery assembly 91, the monoblock system shown in FIG. 13 and generally used for securing the lead storage battery appears to be feasible. However, the monoblock system cannot be used in association with the sealed alkaline storage battery because of the possibility that the performance will decrease as a result of leakage of electrolyte through areas where the inner leads extend across an inner wall of the electrolyte vessel and also because no space is available between the neighboring storage batteries for passage of the cooling air.

Accordingly, the mounting method shown in FIGS. 31 and 32 has been employed in combination with a reinforcement such as by the use of reinforcement fixtures 98 shown by phantom lines in FIG. 32 and secured to the side clamp bands 99 at one arm and also to the support structure 94 at the opposite arm. It has, however, been found that the use of the mounting method in combination with the reinforcement is still insufficient to firmly secure the individual storage batteries, accompanied by an insufficient efficiency of utilization of space.

SUMMARY OF THE INVENTION

Accordingly, the present invention has been devised to substantially eliminate the problems associated with head dissipation and insulation at the junctions between the neighboring storage batteries, both inherent in the prior art alkaline storage battery and is intended to provide an improved easy-to-handle alkaline storage battery system wherein increase in temperature of the storage battery during high-rate charging and discharging is advantageously suppressed to increase the lifetime thereof.

In order to accomplish the foregoing object of the present invention, there is provided a storage battery assembly which comprises a plurality of electrochemical cells each including a generally rectangular box-like electrolyte vessel having an opening, an electrode structure accommodated within the electrolyte vessel and including positive electrode plates and negative electrode plates, a quantity of electrolyte accommodated within the electrolyte vessel, a top lid enclosing the opening of the electrolyte vessel, and pole terminals protruding outwardly from the respective top lid. The electrochemical cells are electrically connected in series with each other by means of generally elongated electroconductive connecting pieces each connecting one of the pole terminals of one electrochemical cell with the other of the pole terminals of the next adjoining electrochemical cell, and are bundled in side-by-side fashion together in a row. An insulating cover made of synthetic resin and having a plurality of vent perforations defined therein is provided on the storage battery assembly so as to cover respective tops of the electrochemical cells with the vent perforations positioned substantially above the connecting pieces.

According to the present invention, not only are the vent spaces formed between the neighboring electrochemical cells then bundled together in side-by-side fashion in a row, but also the storage battery assembly has its top region covered by the insulating cover of an optimized shape having an air cooling effect. By passing air through the vent spaces and then through the interior of the insulating cover, and vice versa, heat generated from the electrochemical cells can advantageously expelled to the atmosphere to achieve a high charge and discharge efficiency and a cycle characteristic of the storage battery assembly.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 28 is an explanatory diagram showing a conception of the prior art storage battery system;

FIG. 29 is an explanatory diagram showing another conception of the prior art storage battery system;

FIG. 30 is a schematic perspective view of the prior art lead storage battery of a type employing a monolithic electrolyte bath.

DETAILED DESCRIPTION OF THE EMBODIMENTS

Figure 1:
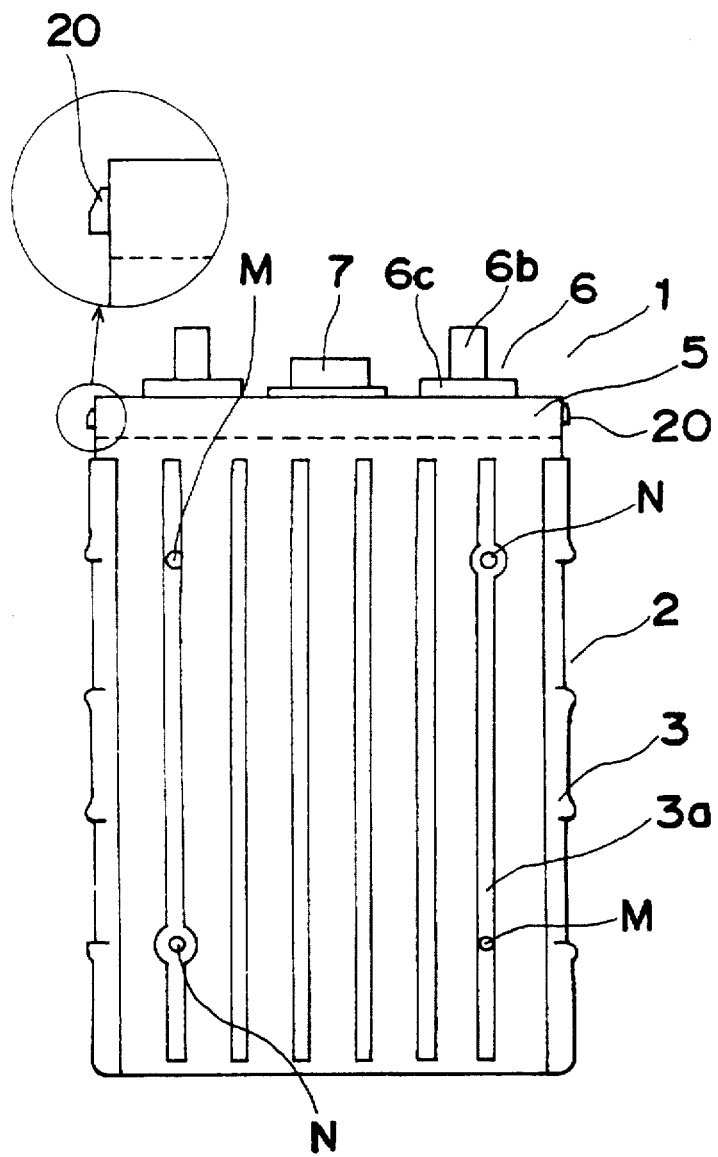
FIG. 1 is a front elevational view of one of cells forming a nickel-hydrogen alkaline storage battery of a 100 amp-hr capacity according to a first preferred embodiment of the present invention.
Figure 3:
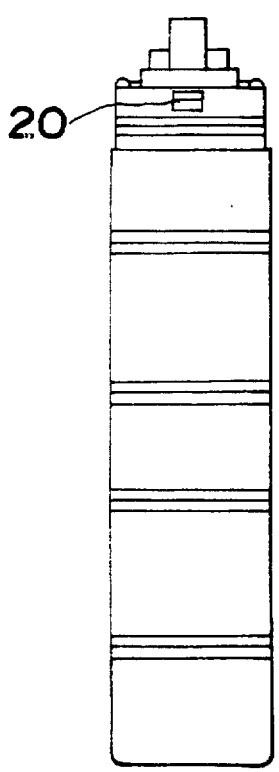
FIG. 3 is a side view of the cell shown in FIG. 1.
Figure 2:
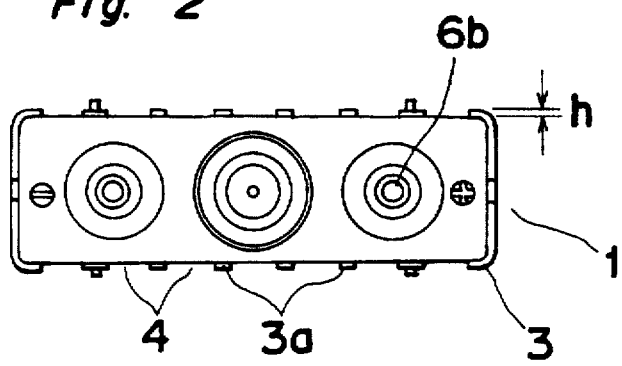
FIG. 2 is a top plan view of the cell shown in FIG. 1.

Referring first to FIGS. 1 to 4, there is shown one of electrochemical cells or storage batteries 1 forming a nickel-hydrogen alkaline storage battery of a 100 amp-hr capacity according to a first preferred embodiment of the present invention. The electrochemical cell 1 comprises a generally rectangular box-like electrolyte vessel 2 of one-piece structure made of any known alkaline-resistant synthetic resin such as, for example, polypropylene or the like and including first and second rectangular major walls opposite to each other, side walls opposite to each other and a bottom wall, and a top lid 5 sealedly closing a top opening of the electrolyte vessel 2. Each of the first and second major surfaces of the electrolyte vessel 2 is integrally formed with longitudinal side ribs 3, positioned adjacent respective opposite sides of the associated major surface, and a plurality of longitudinal intermediate ribs 3a positioned between the side ribs 3 in spaced relation to each other, all of said ribs 3 and 3a having an equal length and extending in a direction generally parallel to the longitudinal axis of the electrolyte vessel 2.

Figure 5:
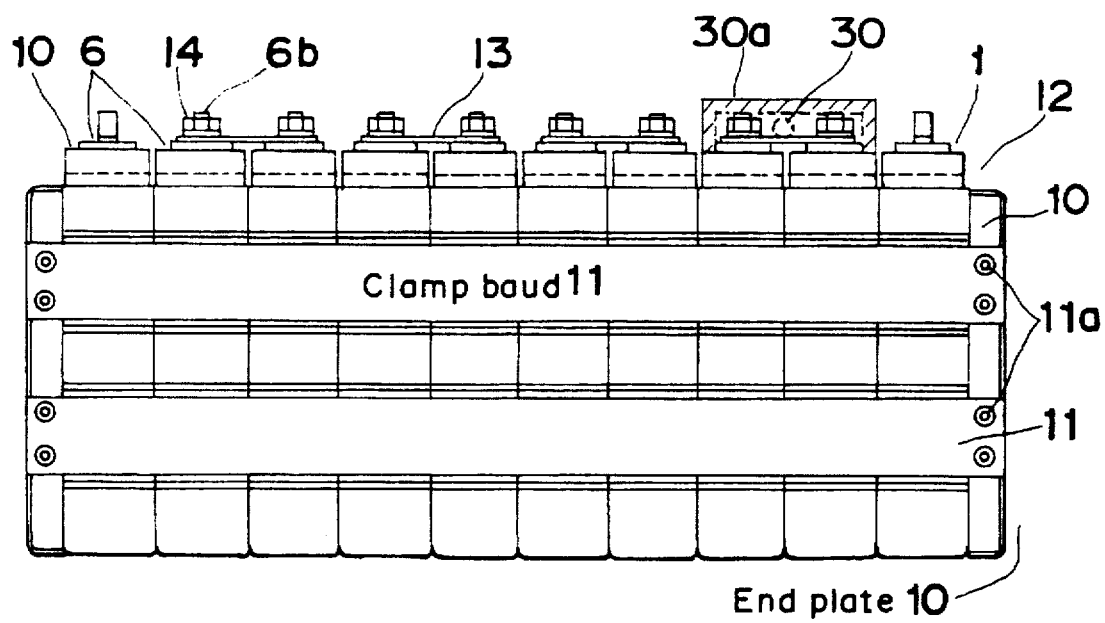
FIG. 5 is a side view of the storage battery according to the first preferred embodiment of the present invention.
Figure 6:
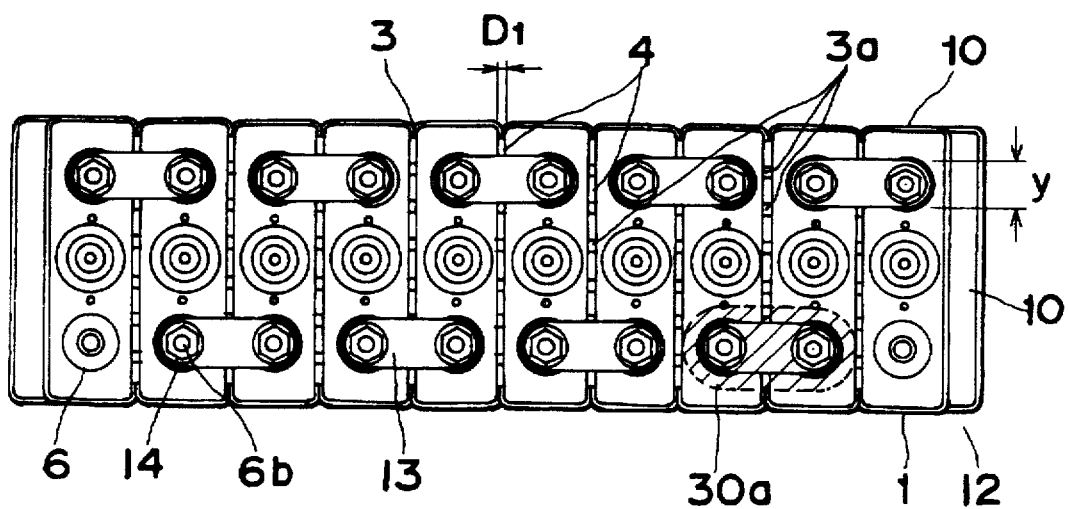
FIG. 6 is a top plan view of the storage battery shown in FIG. 5.

While the ribs 3 and 3a may be arranged in any suitable pattern, arrangement of the ribs 3 and 3a in a substantially symmetric pattern with respect to the longitudinal axis of the vessel 2 such as shown is particularly advantageous in that when the plural electrochemical cells 1 of identical construction are assembled together to provide the storage battery 12 as shown in FIGS. 5 and 6, the ribs 3 and 3a on the first major surface of one of the electrochemical cell 1 can be held in contact with the ribs 3 and 3a on the second major surface of the next adjacent electrochemical cell 1 to thereby define longitudinal stripes of vent spaces 4 regardless of whether the electrochemical cells 1 are electrically connected in series with each other or whether they are electrically connected in parallel to each other.

The lid 5 used to tightly close the electrolyte vessel 2 is preferably made of the same material as that for the electrolyte vessel 2 and has positive and negative terminals 6 and a safety vent 7 all formed thereon. This lid 5 is, after the single electrochemical cell 1 has been prepared, fixed to the electrolyte vessel 2 with its peripheral edges fusion-bonded to the peripheral lip region around the top opening of the electrolyte vessel 2.

Figure 4:
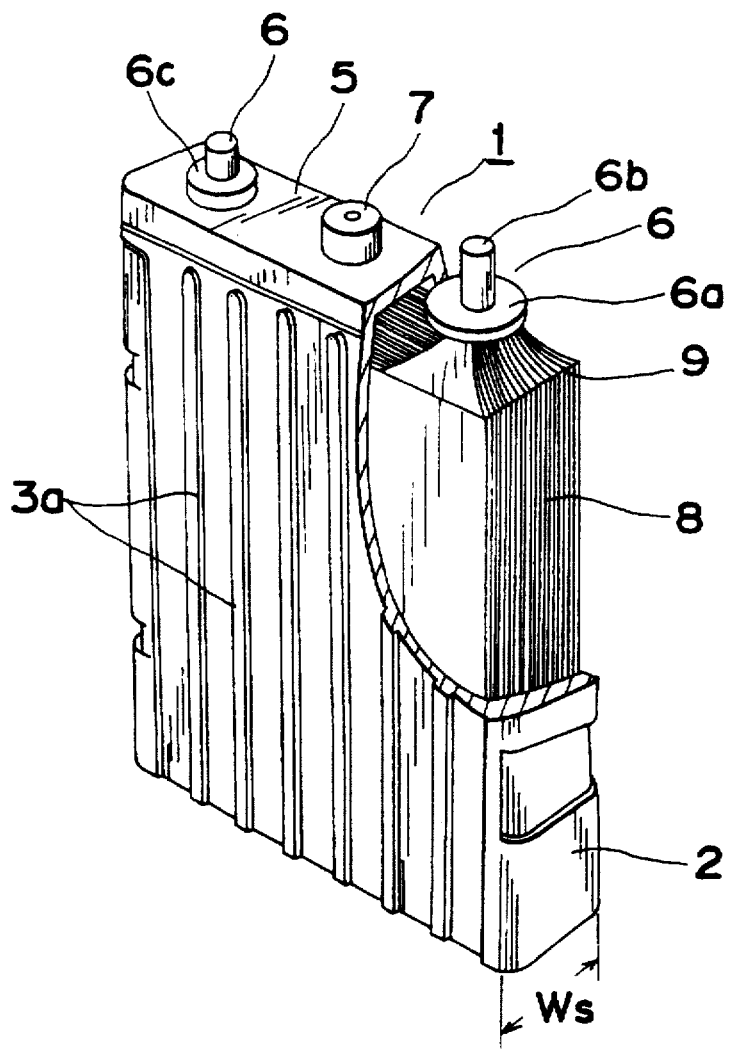
FIG. 4 is a perspective view, with a portion cut away, of the cell shown in FIG. 1.

As best shown in FIG. 4, each electrochemical cell 1 has a laminated electrode structure 8 including a plurality of positive electrode plates made of a nickel oxide as a principal component, a corresponding number of negative electrode plates made of a hydrogen absorbent alloy as a principal component and a separator intervening between one positive electrode plate and the next adjacent negative electrode plate. The laminated electrode structure 8 is accommodated within the electrolyte vessel 2 and immersed in an alkaline electrolyte within the electrolyte vessel 2. Electrode leads 9 extending from the respective electrode plates of the laminated electrode structure 8 are connected with radial flanges 6a integral with the positive and negative terminals 6, respectively, while positive and negative terminal posts 6b forming associated parts of the positive and negative terminals 6 are rigidly secured to the top lid 5 by means of anchor nuts 6c threadingly mounted thereon so as to allow the radial flanges 6a to clamp firmly the top lid 5 in cooperation with the associated anchor nuts 6c.

FIGS. 5 and 6 illustrates the storage battery 12 prepared by juxtaposing a plurality of, for example, ten, electrochemical cells 1 of the structure described with reference to FIGS. 1 to 4 so as to provide a generally rectangular cell block and clamping the electrochemical cells together by the use of generally rectangular end plates 10 and side clamp bands 11, two on each side of the end plates 10. The end plates 10 made of metal or a high strength synthetic resin such as fiber-reinforced plastics are, after the electrochemical cells 1 have been juxtaposed and pressed inwardly by the application of external forces from opposite directions, connected together by the clamp bands 11 each having its opposite ends threaded firmly to the respective end plates 10 by means of tapping screws 11a. With the electrochemical cells 1 so clamped together, the longitudinal ribs 3 and 3a on the first major surface of the vessel 2 of one electrochemical cell 1 are held in contact with the longitudinal ribs 3 and 3a on the second major surface of the vessel 2 of the next adjacent electrochemical cell 1 to thereby define the longitudinal stripes of the vent spaces 4 between the neighboring electrochemical cells 1.

In the illustrated embodiment, the "thickness" of each striped vent space 4 indicated by D1 in FIG. 6 and as defined by the distance of separation between the confronting major surfaces of the respective vessels 2 of the neighboring electrochemical cells 1, which in essence corresponds to the sum of the distance of protrusion of each longitudinal rib 3 or 3a on one electrochemical cell 1 and that on the next adjacent electrochemical cell 1, is chosen to be 2 mm in consideration of the density of battery energies. In other words, the distance of protrusion of each longitudinal rib 3 or 3a, indicated by h in FIG. 2, on any one of the electrochemical cells 1 forming the storage battery of the present invention is chosen to be 1 mm. In an alkaline storage battery system of the present invention in which an insulating cover capable of being air-cooled is mounted on the storage battery 12 and a ventilating means is utilized to allow air to flow in a direction perpendicular to the longitudinal sense of the rectangular cell block, it has been found as a result of studies conducted on the dimensions and morphology of the laminated electrode structure, the quantity of the electrolyte used and other parameters that if each electrochemical cell 1 is 38 mm in thickness, the thickness D1 of 2 to 2.5 mm for each striped vent space 4 is sufficient to secure a sufficient draft of air ventilated.

As best shown in FIG. 6, the electrochemical cells 1 forming the storage battery 12 are electrically connected in series with each other by means of substantially elongated connecting pieces 13. Each of the connecting pieces 13 is made of a highly electroconductive material and has its opposite ends formed with respective holes for passage therethrough of the positive and negative terminal posts 6b. As shown therein, each connecting piece 13 is mounted with the positive and negative terminal posts 6b in the neighboring electrochemical cells 1 extending through the opposite holes thereof, respectively, and is in turn secured in position by means of respective anchor nuts 14 externally threadingly mounted on the positive and negative terminal posts 6b.

Figure 7:
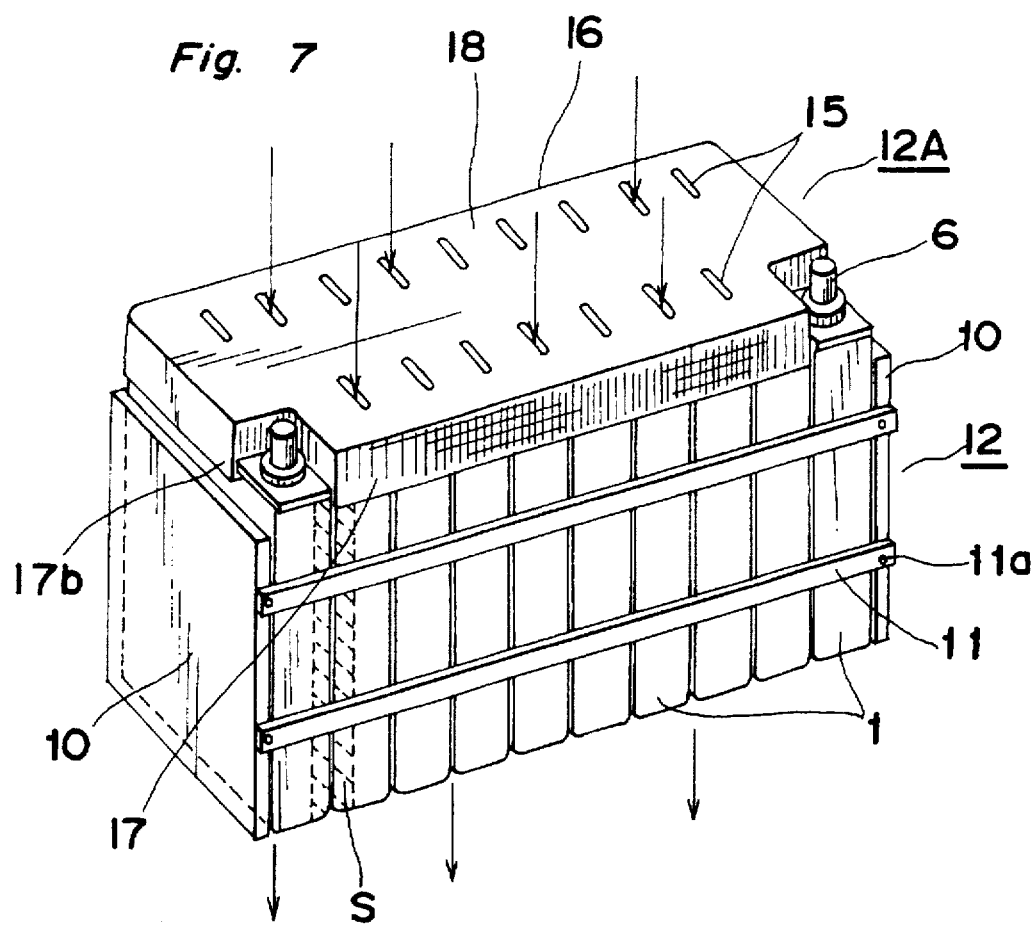
FIG. 7 is a perspective view of the storage battery of FIG. 5 completed with an insulating cover mounted thereon.
Figure 8:
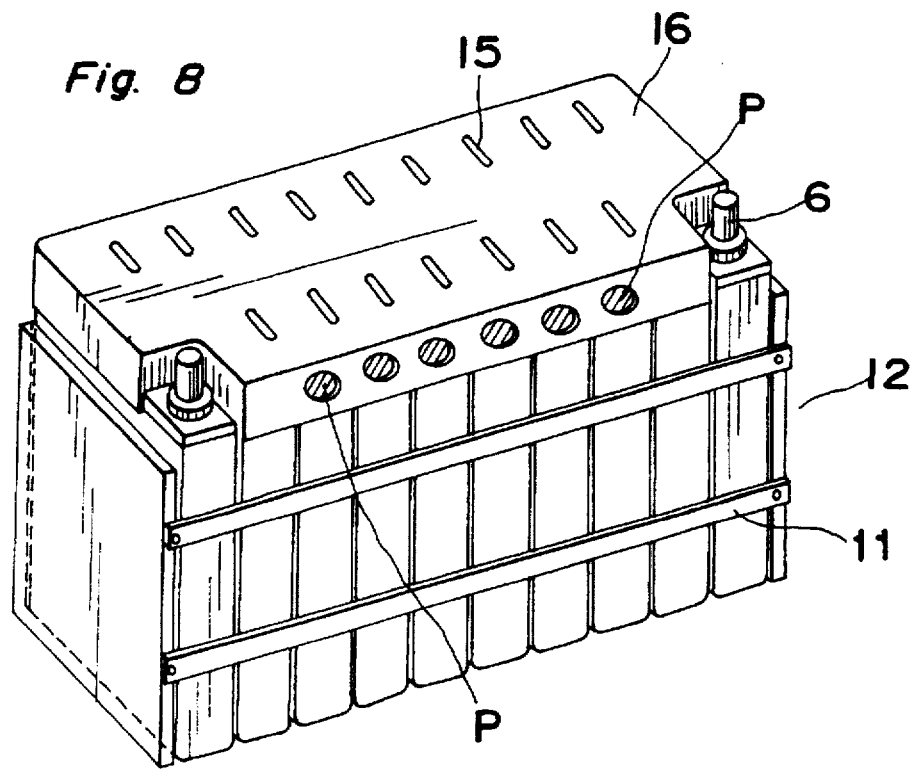
FIG. 8 is a view similar to FIG. 7, showing the insulating cover formed with vent holes.

The storage battery 12 includes a generally rectangular insulating cover 16 mounted atop the storage battery 12 as best shown in FIGS. 7 and 8. The insulating cover 16 is of one-piece structure including a top panel 18 having a pattern of vent perforations 15 defined therein and a peripheral wall 17 flanged transversely downwardly from a peripheral edge of the top panel. This insulating cover 16 is mounted on the storage battery 12 with a lower edge of the peripheral wall 17 thereof fixed to a top peripheral edge of the storage battery 12 so as to conceal the only positive and negative terminals 6 which are connected in series with each other by means of the connecting pieces 13, thereby completing assemblage of the storage battery assembly 12A inclusive of the insulating cover 16. As a matter of design, only two terminals, that is, the positive and negative terminals 6 which are not covered by the insulating cover 16, are used for electric connection with an external electric appliance.

Where the metallic vessel 2 is used for each of the electrochemical cells 1, no vent spaces such as indicated by 4 may be needed because of a high thermal conductivity exhibited by the metallic vessel 2. However, dissipation of heat from the positive and negative terminals 6 to the outside of the insulating cover 16 is essential even though the electrolyte vessels 2 are made of metal. Accordingly, particularly where the electrolyte vessels 2 are made of metal, the peripheral wall 17 of the insulating cover 16 is preferably formed with a plurality of vent holes P as shown in FIG. 8 so that air outside the complete storage battery assembly 12A can flow in and out through the vent holes P to transport the heat from the positive and negative terminals 6 to the outside of the insulating cover 16.

Figure 9:
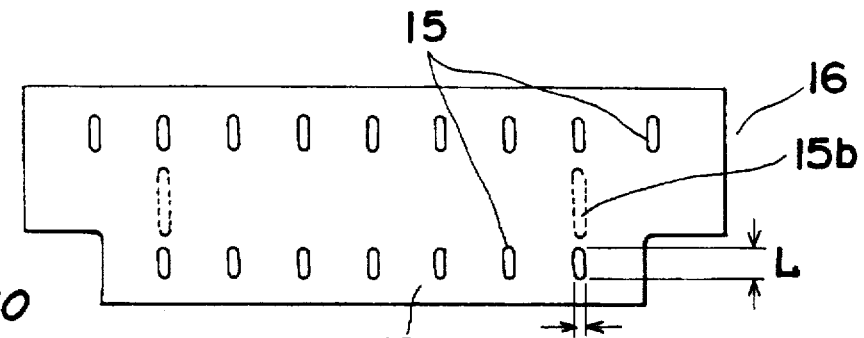
FIG. 9 is a schematic top plan view of the insulating cover shown in FIG. 7.
Figure 10:
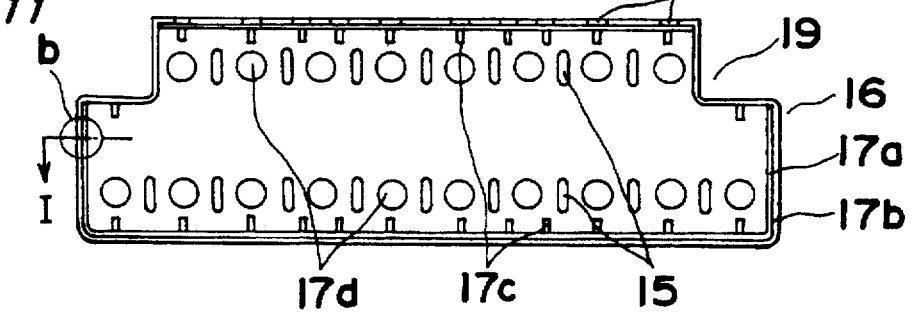
FIG. 10 is a side view of the insulating cover shown in FIG. 9.
Figure 11:
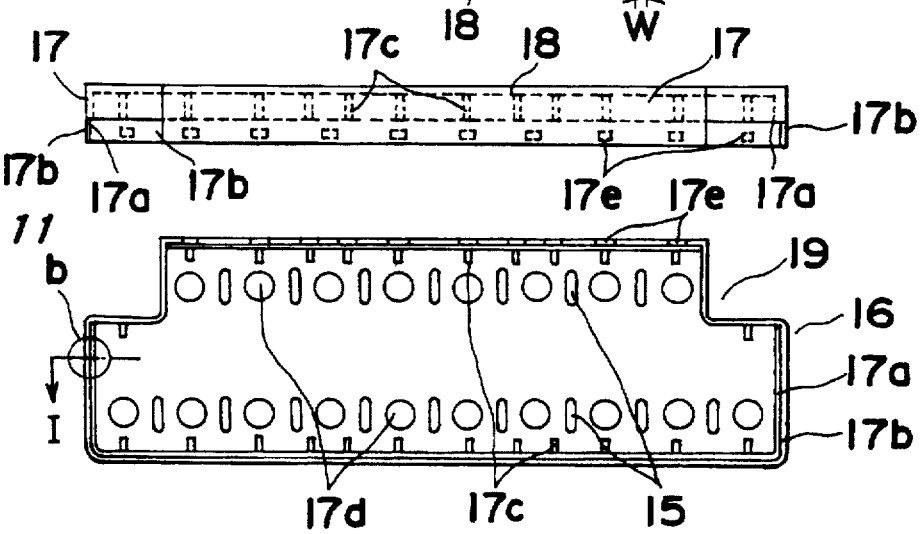
FIG. 11 is a bottom plan view of the insulating cover shown in FIG. 9.

The details of the insulating cover 16 employed in the complete storage battery assembly 12A are shown in FIGS. 9 to 14. Referring particularly to FIGS. 9 to 11, the insulating cover 16 is preferably made of a material which may be the same as or similar to the material used to form the lid 5 or the electrolyte vessel 2, or a synthetic resin of a high rigidity.

The size of each of the vent perforations 15 defined in the top panel 18 of the insulating cover 16 is one of the most important elements of the present invention. Specifically, the vent perforations 15 are in the form of a slot having a width W and a length L and are defined in the top panel 18 so as to occupy respective positions immediately above respective points of traverse of the connecting pieces 13 across the striped vent spaces 4 beneath such connecting pieces 13 with their lengthwise direction oriented transverse to the longitudinal axis of the top panel 18 as shown in FIGS. 9 and 11. As a variation, the top panel 18 of the insulating cover 16 is of a shape formed with recessed grooves continued from the peripheral wall 17 of the insulating cover 16, wherein the vent perforations 15 are formed in the recessed grooves.

The pattern of the vent perforations 15 so defined in the top panel 18 in the manner described above is satisfactory where each electrochemical cell 1 has a relatively small thickness as indicated by Ws in FIG. 4. However, where each electrochemical cell 1 has a width greater than twice the thickness Ws thereof as viewed in FIGS. 1 and 4, formation of additional vent holes in the form of either a similar slot or a smaller round hole on the top panel 18 at respective positions above localities where no connecting piece such as indicated by 3 are present, to secure a large draft of air that can be ventilated and also to secure uniform dissipation of heat from the respective walls of the individual electrochemical cells 1. In the illustrated embodiment, the additional vent holes are each formed above a space on an extension of the respective connecting piece 13 (as indicated by the asterisk marking in FIG. 9).

Selection of the particular shape (slot) for each vent perforation 15 is based on the finding that the efficiency of heat exchange taking place inside the insulating cover 16 and in the vicinity of the connecting pieces 13 can be increased if each of the vent perforations 15 has a small opening sufficient to allow a draft of air to flow at a high velocity and, at the same time, the incoming air be uniformly applied to the connecting pieces 13 over the width thereof.

In any event, each vent perforation 15 may be in the form of a plurality of small round holes each having a diameter generally equal to the width of the slot-shaped vent perforations.

Figure 13:
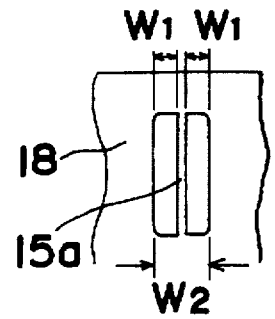
FIG. 13 is a fragmentary front elevational view, on an enlarged scale, of a portion of the insulating cover, showing a modified form of vent holes used in the insulating cover.

The length L of each slot-shaped vent perforation 15 shown in FIG. 9 is chosen to be within the range of about 0.5 to 2, preferably 0.8 to 1.2, times the width y (FIG. 6) of each connecting piece 13. In the illustrated embodiment, however, the length L of each slot-shaped vent perforation 15 is chosen to be 18 mm (0.9 times the width y) against the width y of each connecting piece 13 which is 20 mm. On the other hand, the width W of each slot-shaped vent perforation 15 is chosen to be within the value equal to and three times the thickness D1 of each striped vent space 4, the specific value of which may be determined in consideration of the width of each electrochemical cell 1 and the air flow rate. To avoid any possible shortcircuitting between any one of the connecting pieces 13 and external foreign matter present outside the storage battery 12, this width is preferably limited to 5 to 6 mm. However, if a relatively great width is necessitated for each vent perforation, the use is recommended of the plural small round holes for each vent perforation or, alternatively, as shown in FIG. 13, each vent perforation may be employed in the form of a pair of juxtaposed slots separated from each other with a longitudinal crosspiece 15a intervening therebetween, each of the juxtaposed slots having a width W1 within the range of 5 to 6 mm. In the illustrated embodiment, the width W1 is chosen to be 5 mm which is 2.5 times the thickness D1 of the vent space 4.

If the slot-shaped vent perforations 15 has a width smaller than 2 mm, a considerable loss of pressure will occur during passage of air through the slot-shaped vent perforations 15 accompanied by reduction in heat exchange efficiency. On the other hand, if the slot-shaped perforations 14 has a width greater than 7 mm, dissipation of heat from the connecting pieces 13 will be reduced, accompanied by reduction in safety factor. Accordingly, the slot-shaped vent perforations 15 should preferably have a width within the range of 2 to 7 mm.

Figure 12:
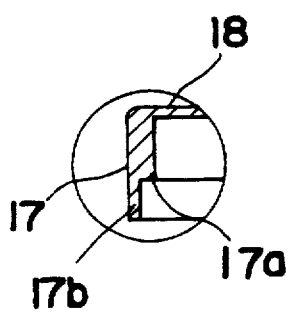
FIG. 12 is a fragmentary view showing, on an enlarged scale, a portion of the insulating cover that is indicated by b in FIG. 11.

As shown in FIGS. 9 and 11, the insulating cover 16 includes the top panel 18 where the slot-shaped vent perforations 15 are defined is of a generally rectangular shape with two corner regions 19 cut away so that when the insulating cover 16 is capped atop the storage battery 12 to provide the complete storage battery assembly 12A, only the positive and negative terminals 6 which can be used for electric connection with an external electric appliance can be exposed to the outside. This insulating cover 16 also includes the peripheral wall 17 depending from the peripheral edge of the top panel 18 and adapted to be mounted on the storage battery 12 to enclose the space above the top of the storage battery. As best shown in FIGS. 10, 11 and 12, the peripheral wall 17 has a lower peripheral edge inwardly recessed to define a skirt 17b and a shoulder 17a lying perpendicular to the skirt, wherefore when the insulating cover 16 is mounted atop the storage battery 12, the shoulder 17a rests on respective top edges of the top lids 5 that bound the top peripheral edge of the storage battery 12 while the skirt 17b encircles and is fixed to a top lateral region of the storage battery 12 in contact therewith. For reinforcing the top panel, the peripheral wall 17 has an inner surface formed with a plurality of spaced reinforcement ribs 17c each having one end integral or rigid with the top panel 18 and extending in a direction perpendicular to the top panel 18.

Figure 14:
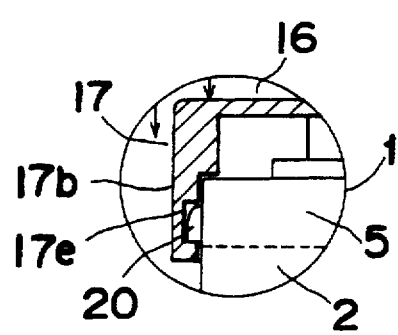
FIG. 14 is a fragmentary sectional view, on an enlarged scale, showing the manner by which the insulating cover is engaged to the cell.

Fixing of the skirt 17b to the top lateral region of the storage battery 12 may be carried in any suitable manner such as, for example, by the use of any welding technique, a bonding agent or set screws. However, a snap-fit method is most preferred since the insulating cover 16 once mounted on the storage battery 12 can be removed therefrom by the aid of a screw driver when so necessitated for inspection purpose or replacement of one or some of the electrochemical cells with fresh one or ones. To accomplish this, as best shown in FIG. 14, each the outermost two of the electrochemical cells 1 positioned adjacent the respective end plates 10 has an outer side face formed with a respective anchor pawl 20 protruding laterally outwardly therefrom. On the other hand, respective inner portions of the skirt 17b of the peripheral wall 17 which correspond in position to the anchor pawls 20 are inwardly recessed to define a detent recess 17e such that, when the insulating cover 16 is mounted on the storage battery 12, the peripheral wall 17 of the insulating cover 16 can be snap-fitted onto the top of the storage battery 12 with the anchor pawls 20 engaged in the associated detent recesses 17e.

Although in the example shown in FIG. 14 the anchor pawls 20 have been shown and described as provided in the relevant top lids 5 of the electrochemical cells 1, they may be formed on top areas of the respective first and second major surfaces of the electrolyte vessels 2 forming parts of those two outermost electrochemical cells 2.

It is incidentally pointed out that in order to facilitate assemblage of the electrochemical cells 1 in the juxtaposed fashion, the first and second major surfaces of each of the electrolyte vessels 2 may have anchor protuberances M and anchor recesses N in respective patterns complemental to each other, as shown in FIG. 1, so that when the electrochemical cells 1 are assembled together, the anchor protuberances M on the first or second major surface of one electrochemical cell 1 can be engaged in the anchor recesses N on the second or first major surface of the next adjacent electrochemical cell 1 while the anchor recesses 12d on the first or second major surface of such one electrochemical cell 11 can receive therein the anchor protuberances M on the second or first major surface of such next adjacent electrochemical cell 1. The use of the anchor protuberances M and their mating anchor recesses N is effective to provide the complete storage battery assembly that can be easily assembled and that is robust against an external twisting force or vibration.

As best shown in FIG. 11, the top panel 18 of the insulating cover 16 has its inner surface formed with a pattern of recesses 17d to provide corresponding thin-walled panel portions, said recesses 17d being defined at respective locations aligned with the anchor nuts 6c on the positive and negative terminal posts 6b so that they can be accommodated within the recesses 17d. The presence of the recesses 17d makes it possible to keep the overall height of the complete storage battery assembly 12A as small as possible.

Referring to FIGS. 7 and 8, the complete storage battery assembly 12A is so designed that the ventilating air can flow in a direction generally heightwise thereof from the vent perforations 15 in the insulating cover 16 through the striped vent spaces 4 as indicated by the arrows, but other areas are tightly sealed.

Figure 15:
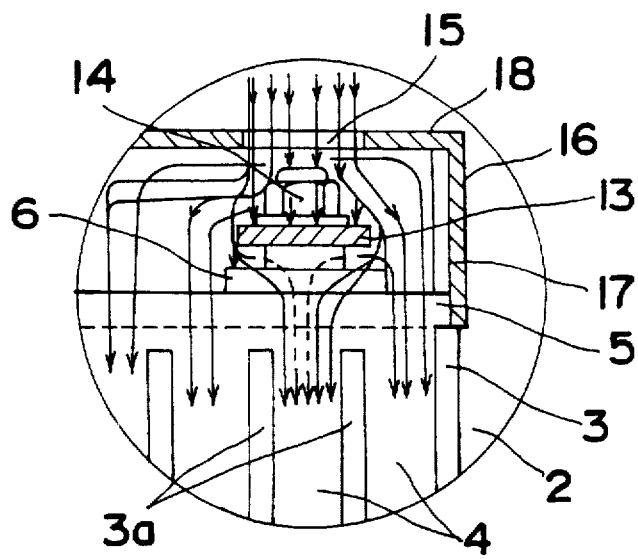
FIG. 15 is a schematic diagram showing vent passages delimited in the storage battery in communication with the vent holes in the insulating cover.
Figure 16:
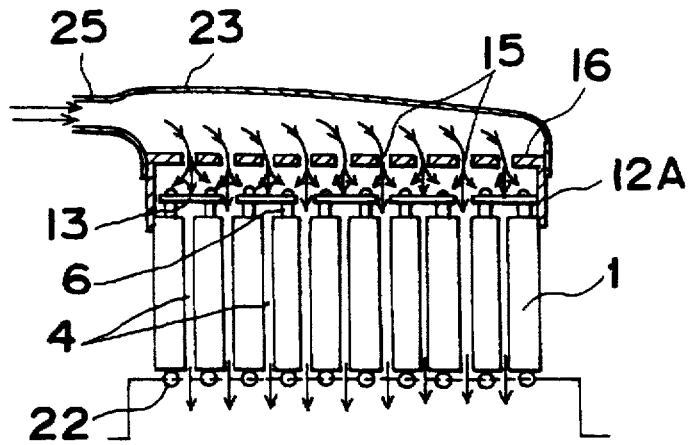
FIG. 16 is a schematic diagram showing a conception of use of a ventilating hood with the storage battery.
Figure 17:
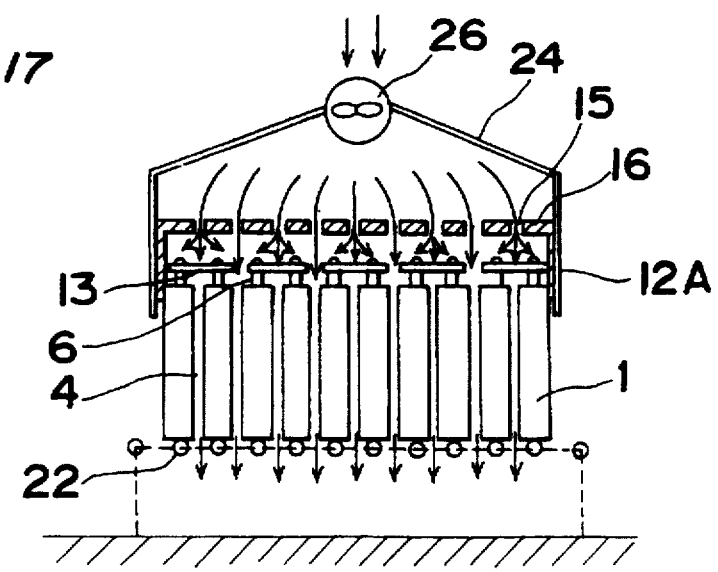
FIG. 17 is a schematic diagram showing a conception of use of a forced draft cooling system used in association with the storage battery.

Referring now to FIGS. 15 to 17, when in use, the complete storage battery assembly 12A, that is, the storage battery 12 with the insulating cover 16 mounted thereon, is fixedly mounted on a ventilating base 22 and is then fluid-coupled with a ventilating system such as a ventilating hood 23 as shown in FIG. 16 or an air cooling device 24 as shown in FIG. 17 that is mounted atop the complete storage battery assembly 12A, to thereby provide an alkaline storage battery system. The ventilating system employed in this alkaline storage battery system is best shown in FIG. 15 in which only one slot-shaped vent perforation 15 in the insulating cover 16 and its vicinity are schematically shown.

As shown in FIG. 15, the pattern of flow of a stream of cooling air externally entering the slot-shaped vent perforation 15 immediately above the associated connecting piece 13 is shown by the arrows. After the stream of cooling air entering the slot-shaped vent perforations 15 has impinged upon the connecting pieces 13, the associated positive and negative terminals 6 and the associated anchor nuts 24, it flows into the striped vent spaces 4 and further flows downwardly along the striped vent spaces 4 before being discharged to the outside from the bottom of the complete storage battery assembly 12A by way of the ventilating base 22.

In the case of the complete storage battery assembly 12A wherein the electrochemical cells are connected in series with each other such as shown in FIGS. 7 and 8, 40% or more of the total amount of cooling air entering the slot-shaped vent perforations 15 contacts metallic component parts of a high thermal conductivity such as the connecting pieces 13, the positive and negative terminals 6 and others to assist dissipation of heat therefrom and, therefore, this heat dissipation in combination of heat radiation from the vessels 2 of the respective electrochemical cells 1 effectively suppresses increase in temperature of the laminated electrode structure 8 in each of the electrochemical cells 1.

The ventilating system referred to above will now be described with particular reference to FIGS. 16 and 17. The ventilating base 22 on which the complete storage battery assembly 12A is mounted may be a framework of rods and/or steel angle members effective to provide a vent space between the bottom of the complete storage battery assembly 12A and a support surface such as, for example, a floor or a ground surface, so that the air discharged from the bottoms of the striped vent spaces 4 can further be ventilated away from the complete storage battery assembly 12A. The use of the ventilating hood 23 shown in FIG. 16 as mounted on the complete storage battery assembly 12A so as to cover the insulating cover 16 is particularly useful where the complete storage battery assembly 12A is mounted below a carriage of a mobile body such as, for example, an electric motorcar. In this case, an air intake port 25 of the ventilating hood 23 should be oriented in a direction conforming to the direction of movement of the mobile body so that the stream of cooling air can flow in such a direction as shown by the arrows in FIG. 16 so as to impinge upon the connecting pieces 13 and then through the striped vent spaces 4 to accomplish cooling of the complete storage battery assembly 12A.

The air cooling device 24 shown in FIG. 17 may comprise a hood covering the insulating cover 26 on the complete storage battery assembly 12A and an electrically operated blower 26 such as, for example, a sirocco fan for providing a forced draft of cooling air. Where the blower 26 is used in combination with any suitable cooling means such as, for example, a refrigerating device or a heat pipe, the cooling of the complete storage battery assembly 12A can be enhanced. The ventilating system shown in FIG. 16 is particularly suited for use in an environment in which a relatively high electric current is discharged from the complete storage battery assembly 12A whereas the ventilating system shown in FIG. 17 is particularly suited for use in an environment where the complete storage battery assembly is used as a power source for an electric motorcar, which is quickly charged at, for example, a charge station, or a large-size electric appliance.

However, in the case of the storage battery system for use in the electric motorcar, the ventilating system shown in FIG. 17 may be employed and may be operated in such a way that during the charging the blower 26 is driven by an external electric power source, but during run of the electric motorcar, the blower 26 is deenergized and, instead, a naturally occurring air is allowed to enter the hood. This is particularly advantageous in that a loss of energies can be minimized and an effect of suppression of temperature increase of the storage battery can also be increased.

The ventilating system shown in and described with reference to FIG. 16 or FIG. 17 wherein the air stream floss from top down to bottom across the storage battery is particularly useful where the complete storage battery assembly 12A is required to be installed at a relatively low level to lower the center of gravity of, for example, the electric motorcar. However, depending on the support structure for the support of the complete storage battery assembly 12A where the complete storage battery assembly is required to be installed at a relatively low level for the purpose of, for example, lowering the center of gravity of, for example, the electric motorcar or any other electric appliance, a suction fan may be employed in place of the blower 26 so that the cooling air can be drawn from bottom of the complete storage battery assembly so as to flow upwardly through the striped vent spaces 4 and be then discharged from the slot-shaped perforations 15 after having impinged upon the connecting pieces 13 and the positive and negative terminals 6.

Alternatively, the air cooling device 24 which has been shown and described as mounted atop the complete storage battery assembly 12A may be disposed below the complete storage battery assembly 12A so that the air stream can flow upwardly through the striped vent spaces 4 and be then discharged from the slot-shaped perforations 15 after having impinged upon the connecting pieces 13 and the positive and negative terminals 6. Even in this alternative version, a suction fan may be employed in place of the blower so that the air stream can flow downwardly through the striped vent spaces 4.

In describing the ventilating system, reference has been made to the single complete storage battery assembly 12A. However, the single ventilating system may be used for a plurality of complete storage batteries to maximize the efficiency of utilization of the limited space available in, for example, the electric motorcar or any other electric appliance.

The ventilating base 22 discussed previously may be a part of the support structure for the support of the complete storage battery assembly 12A. Fixing of the complete storage battery assembly 12A on and to the ventilating base 22 may be carried in a manner which will now be described with particular reference to FIGS. 18 and 19.

Figure 18:
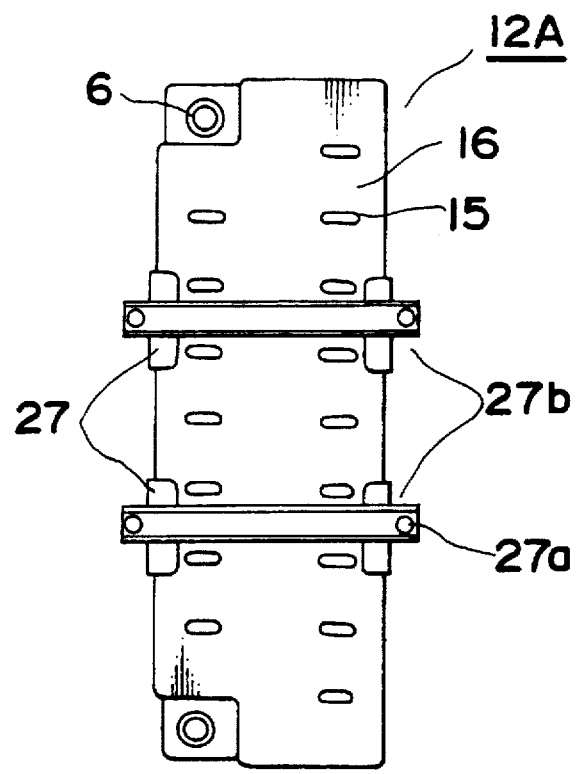
FIG. 18 is a schematic top plan view of the completed storage battery, showing how the completed storage battery is fixedly mounted on a ventilating base.
Figure 19:
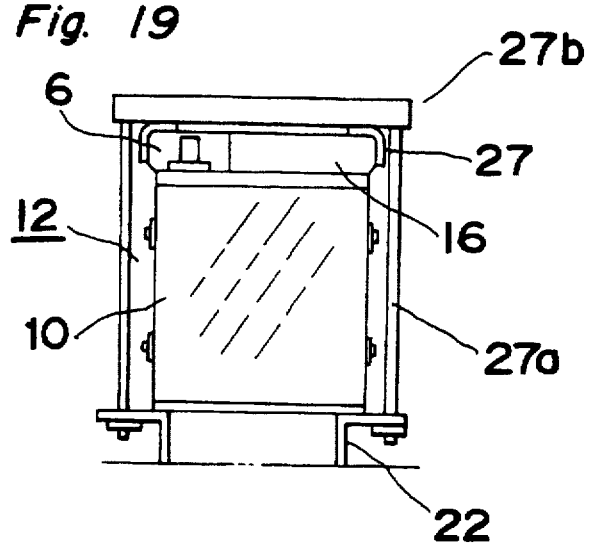
FIG. 19 is a schematic side view of the system shown in FIG. 18.

As shown in FIGS. 18 and 19, after the complete storage battery assembly 12A has been mounted on the ventilating base 22, the latter is fixed to the ventilating base 22 by the use of one or more known fixing means such as employed in association with the prior art storage battery of a type employing a monolithic electrolyte bath such as shown in FIG. 30. So far as shown in FIGS. 18 and 19, the complete storage battery assembly 12A is fixed in position on the ventilating base 22 by the use of two battery fixtures 27b each including a retainer bar 27 and double-threaded bolts 27a in combination with respective fastening nuts. It is, however, to be noted that when the complete storage battery assembly 12A is fastened to the ventilating base 22 by the use of the battery fixtures 27b such as shown therein, the insulating cover 16 may be damaged as a possible result of deformation thereof induced by an excessive fastening load and this is particularly true where the insulating cover 16 has a wall thickness not greater than 1 mm. On the other hand, if the insulating cover 16 has a wall thickness exceeding 4 mm, the insulating cover 16 will impose an increased weight on the storage battery, accompanied by a considerable reduction in density of energies per unitary weight of the complete storage battery assembly.

It has been found that the clamp strength exhibited by the end plates 10 in combination with the clamp bands 11 for clamping the electrochemical cells 1 together in the juxtaposed fashion could have been increased by the retention of the electrochemical cells 1 (particularly, corner areas of the respective top lids 5) by the shoulder 17a and the reinforcement ribs 17c provided inside the insulating cover 16 and by the snap-fit of the skirt 17b of the insulating cover 16 against the top lateral faces of the electrochemical cells 1. Accordingly, any possible lateral displacement of the juxtaposed electrochemical cells 1 and the consequent loosening of the connecting pieces 13 could be eliminated without being accompanied by a reduction in efficiency of utilization of the limited space for installation of the complete storage battery assembly. In addition, although the use of the insulating cover 16 having the slot-shaped vent perforations 15 defined in the top panel 18 thereof is effective to avoid any possible ingress of slender members such as metallic rods to thereby avoid any possible electric shortcircuitting, the use of each vent perforation 15 in the form of a row of small round holes is more effective to avoid the possible shortcircuitting with external metallic elements.

Figure 20:
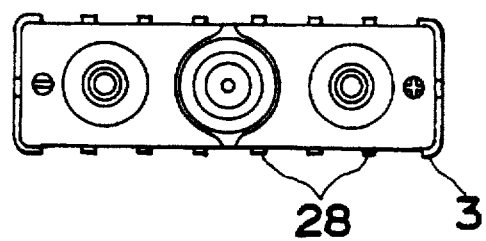
FIG. 20 is a schematic top plan view of one of the cells of the storage battery according to a second preferred embodiment of the present invention.
Figure 21:
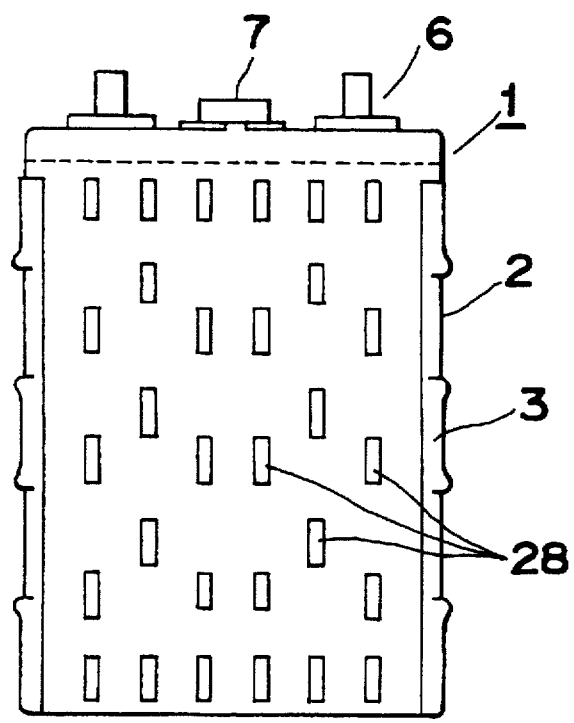
FIG. 21 is a schematic front elevational view of the cell shown in FIG. 20.

Each electrochemical cell 1 of the storage battery 12 according to a second preferred embodiment of the present invention will now be described with reference to FIGS. 20 and 21. The electrochemical cell 1 shown therein is substantially similar to that shown in and described with reference to FIGS. 1 to 3, except that, in place of the longitudinal intermediate ribs 3a shown in FIGS. 1 and 2, a plurality of vertical rows of crests 28 spaced in a direction heightwise of the electrochemical cell 1 are employed on the first and second major surfaces of the associated electrolyte vessel 2. The use of the vertical rows of the crests (or rib segments each shorter in length than the longitudinal intermediate rib 3a) 28, is effective to increase the area of surface of contact with the cooling air to thereby enhance the heat exchange between the cooling air and the individual electrochemical cell 1.

Where the crests 28 are to be employed such as shown in FIGS. 20 and 21, they may be so patterned and so positioned that the number of the crests 28 located at a central portion of each of the first and second major surfaces of each electrolyte vessel 2 which is susceptible to expansion during the use of the storage battery is greater than that located at the remaining portion of the respective major surface. Alternatively, they may be so patterned and so positioned that the spacing between the neighboring crests 28 may be progressively increased with increase of the distance away from that central portion of each major surface of the respective electrolyte vessel 2. By do doing, the cooling air can be allowed to flow uniformly through the striped vent spaces 4 and also past the connecting pieces 13 to accomplish a uniform heat exchange.

According to the embodiment shown in FIGS. 20 and 21, if the outermost two of the longitudinal side ribs 3 are employed in the form of similar crests or shorter ribs, an adhesive seal tape or a resinous film applied with a bonding agent must be applied as at S (FIG. 7) to a joint between the lateral long sides of the neighboring electrolyte vessels 2 to fill up lateral gaps which would otherwise be formed therebetween. If the lateral gaps are not sealed off, the cooling air being ventilated will leak laterally to the outside of the storage battery, accompanied by reduction in cooling effect. Accordingly, considering the workability involved in assembling the complete storage battery assembly, the opposite sides of each electrolyte vessel 2 are preferably provided with such longitudinal side ribs as indicated by 3 in FIGS. 1 and 3 even though the crests 28 discussed above are employed in place of the longitudinal intermediate ribs 3a.

While in any one of the foregoing embodiments the electrolyte vessel 2 for each of the electrochemical cells 1 has been described as made of synthetic resin, it may be made of metal which may be stainless steel known as having a relatively low thermal conductivity. In addition, any one of the foregoing embodiments of the present invention discussed above is rather preferred where each of the electrochemical cells 1 has a relatively large width, that is, where each electrochemical cell 1 is of a type having a relatively low heat emission because of the laminated electrode structure 8 having a relatively large thickness.

However, where the metallic electrolyte vessel 1 for each electrochemical cell 1 is to be formed by the use of a metal drawing technique, formation of the longitudinal ribs that define the vent spaces requires a complicated procedure, accompanied by a problem associated with machinability. This problem may be eliminated if the metallic vessel 1 having no longitudinal ribs is employed and having the flat first and second major surfaces opposite to each other and, in combination therewith, an insulating spacer/retainer plate such as shown by 29 in FIGS. 22 and 23 is to be employed between the neighboring voltaic vessels 2.

Figure 22:
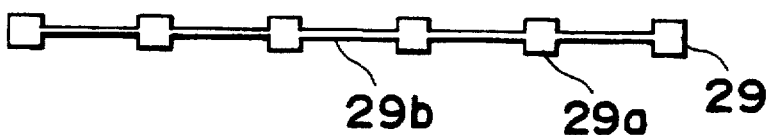
FIG. 22 is a schematic top plan view showing a spacer/retainer plate employed in the storage battery according to a third preferred embodiment of the present invention.
Figure 23:
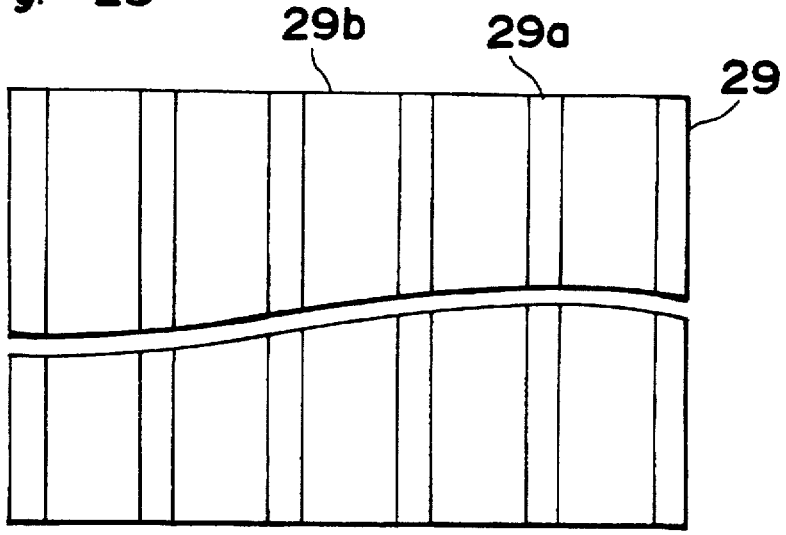
FIG. 23 is a schematic front elevational view of the spacer/retainer plate shown in FIG. 22.

Referring now to FIGS. 22 and 23, the spacer/retainer plate 29 is made of a synthetic resin and is of one-piece structure including a plurality of spaced longitudinal ribs 29a each corresponding to the height of each electrochemical cell 1 and discrete thin-walled segments 29b each connecting the neighboring longitudinal ribs 29a together. When the plural electrochemical cells 1 are to be assembled and clamped together to provide the storage battery 12, the spacer/retainer plate 29 is interposed between the neighboring electrochemical cells 1 to allow the longitudinal ribs 29a to function in a manner substantially similar to that accomplished by the longitudinal ribs 3 and 3a in any one of the foregoing embodiments and also to serve as an insulator between the neighboring electrochemical cells 1.

Although where the storage battery 12 is assembled in the manner as shown in FIGS. 5 and 6, at least one of the clamp bands 11 and the end plates 10 is required to be made of an insulating material or an insulating tape is required to be interposed between the neighboring electrochemical cells 1, a firm insulation can assuredly be accomplished as compared with the cell-to-cell insulation (using, for example, an insulating coating or an insulating tape) that is embodied in connection with the metallic electrolyte vessels formed with the longitudinal ribs.

If the storage battery obtained by assembling and clamping the electrochemical cells 1 together in the manner described above (although not shown, but similar to that shown in FIGS. 5 and 6) is provided with the insulating cover 16 in combination with the ventilating means, the cooling effect similar to that accomplished in any one of the foregoing embodiments can be obtained. Even where the resinous electrolyte vessels are employed as in any one of the first and second embodiment of the present invention, the spacer/retainer plate 29 can be employed between the neighboring resinous electrolyte vessels if each of those resinous electrolyte vessels has the flat first and second major surfaces with no longitudinal ribs formed thereon. However, since each electrolyte vessel if made of the synthetic resin must have a wall thickness, which may be equal to or greater than about twice the wall thickness of the metallic electrolyte vessel, to secure a sufficient pressure resistance, this may leads to an undesirable reduction in energy density of the complete storage battery assembly.

Charge and discharge tests were conducted to compare increase of the temperature of the storage battery assembly of the present invention with that of some storage battery assemblies designed for comparison purpose. Particulars of the storage battery assembly of the present invention and those of the storage battery assemblies designed for comparison purpose will first be described:

Invention

The storage battery assembly of the present invention which was used for the tests was made up of ten electrochemical cells 1 each being a generally rectangular box-like, sealed nickel-hydrogen all(aline storage battery of 100 Ah in rated capacity. Each electrochemical cell 1 was of a structure substantially as shown in FIGS. 1 to 6, including the lid 5 and the electrolyte vessel 2 made of polypropylene resin and having the longitudinal ribs as means for defining the vent space 4.

The insulating cover 16 shown in FIGS. 9 to 11 and made of hard synthetic resin was capped onto top of the storage battery assembly to complete the single storage battery assembly 12A. The system completed with five such single storage battery assemblies juxtaposed in side-by-side relation to each other. During the test, the forced air cooling system comprised of the ventilating base 22 and the air cooling device 24 as shown in FIG. 17 was used and the air was supplied at a rate of 5 m/s during the charging and at a rage of 1 m/s during the discharging that was selected to approximate a condition of the ventilating hood shown in FIG. 16.

Comparison

For comparison with the battery system of the present invention, four samples were prepared, which are hereinafter referred to as Sample I, Sample II, Sample III and Sample IV.

Sample I was similar in structure to the battery system of the present invention except that no insulating means such as caps and vent cover was employed.

Sample II was also similar in structure to the battery system of the present invention except that as shown by the phantom lines in FIGS. 5 and 6 the separate insulating caps 30a made of a thermoplastic elastomer and having two vent holes 30 defined therein were employed one for each connecting piece 13.

Figure 24:
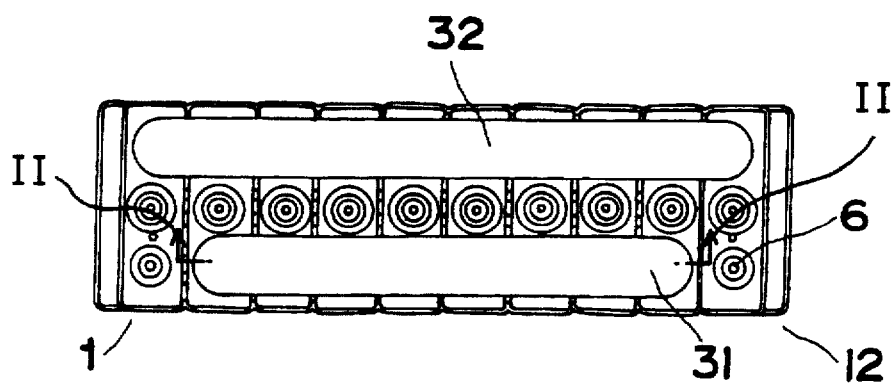
FIG. 24 is a schematic top plan view of a storage battery used only for comparative purpose.
Figure 25:
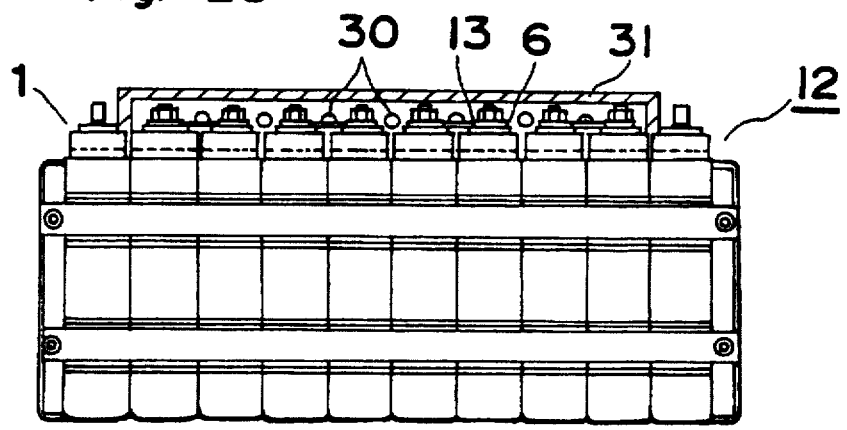
FIG. 25 is a schematic side view of the storage battery shown in FIG. 24.
Figure 26:
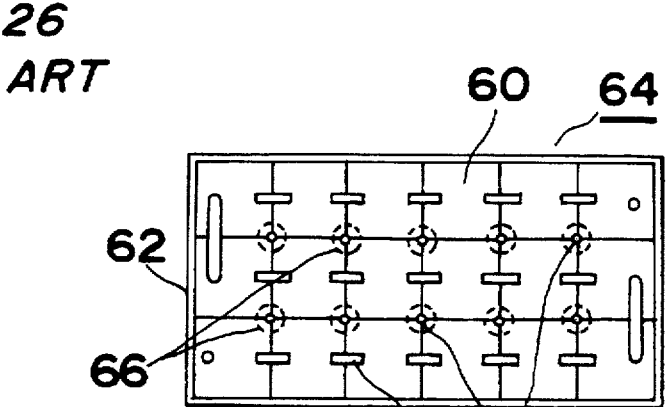
FIGS. 26 and 27 are schematic top plan and side views of one prior art storage battery.
Figure 27:
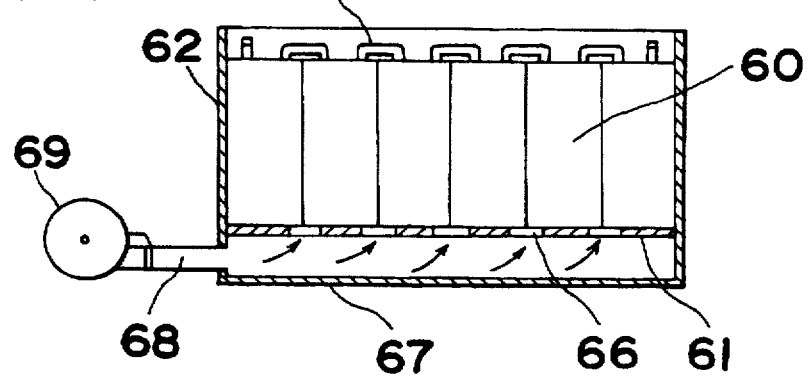
Figure 31:
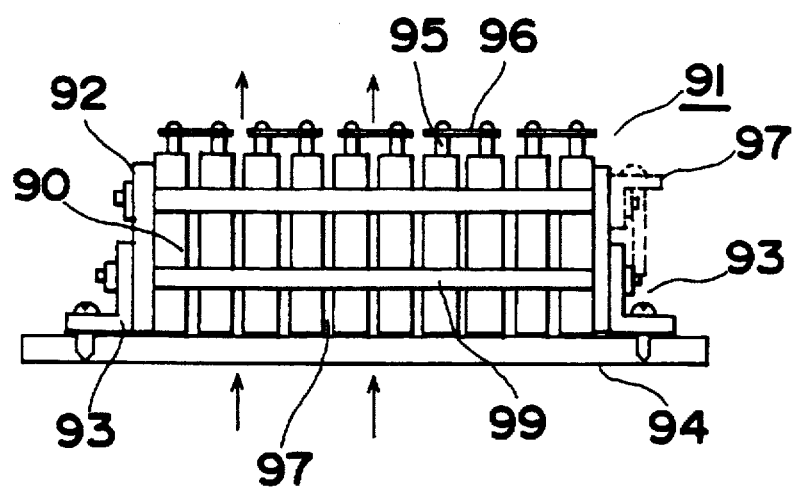
FIGS. 31 and 32 are schematic side and end views of the prior art alkaline storage battery.
Figure 32:
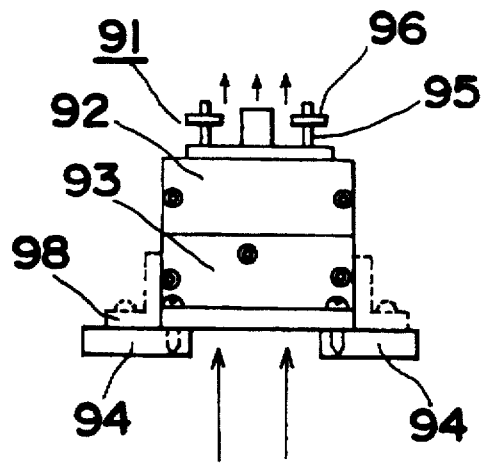

Sample III was similar in structure to the battery system of the present invention except that as shown in FIGS. 24 and 25, two elongated insulating caps 31 and 31 made of a thermoplastic elastomer and having a row of vent holes 30 defined in each of opposite side walls were used to cover respective rows of the terminals.

Sample IV was again similar in structure to the battery system of the present invention except that, instead of the two rows of the slot-like vent perforations 15 defined in the top panel 18 of the insulating cover 16 shown in FIGS. 9 to 11, a similar insulating cover having its top panel formed with seven elongated vent perforations 15b, shown by the phantom line in FIG. 9, each being 6 mm in width and 40 mm in length, was employed.

Even with the Samples I to IV, the forced air cooling system comprised of the ventilating base 22 and the air cooling device 24 as shown in FIG. 17 was used and operated in a manner and under a condition both identical with those employed in testing the storage battery system of the present invention.

All of the battery systems tested were electrically charged under a standard charging condition in which an electric current of 10 A (0.1 CA) was charged to 110% of the discharge capacity (about 11 to 11.5 h) and under a fast charging condition in which an electric current of 40 A (0.4 CA) was charged to a predetermined charge control voltage and, followed by charging of an electric current of 10 A until the system was charged to 110 to 115%. So far as discharge is concerned, all of the battery systems tested were, after having been charged with the electric current, discharged at a mean current of 150 A (1.5 CA) until voltage remaining reached 10 V (1 V per cell).

The comparative tests were conducted at ambient temperature of 23° to 26° C. Measurement of each battery system tested was carried out by the use of thermocouples which were mounted at lead portions of the positive and negative electrode plates within two of the 10 electrochemical cells of the storage battery assembly 12 in the intermediate row and also in the vicinity of intermediate portion of the three connecting pieces used on such two electrochemical cells, to determine the maximum temperatures in each system tested during charging and discharging, followed by averaging those maximum temperatures. Results of the temperature measurement are tabulated in Table 1 below.

TABLE 1

| Charged with | Average Maximum Temperatures (°C.) | | | | |
|---|---|---|---|---|---|
| | Invention | Sample I | Sample II | Sample III | Sample IV |
| 10A | 29 (31) | 31 (33) | 35 (38) | 36 (39) | 33 (37) |
| 40A | 38 (45) | 45 (55) | 52 (64) | 54 (66) | 49 (60) |
| 150A | 47 (52) | 53 (61) | 60 (71) | 63 (73) | 57 (66) |

In Table 1 above, the temperature, not parenthesized, represents the average value of the maximum temperatures measured at the connecting pieces whereas the temperature in parentheses represents the average value of the maximum temperatures measured at the lead portions of the positive and negative electrode plates.

As can readily be understood from Table 1 above, when the storage battery assemblies were charged under the standard charging condition, i.e., with the electric current of 10 A, the battery temperature exhibited by the Invention has increased a lower quantity than that exhibited by any one of the Samples I to IV, but this does not necessarily means that increase of the battery temperature exhibited any one of the Samples I to IV is detrimental.

However, when the storage battery assemblies were charged under the fast charging condition, i.e., with the electric current of 40 A, and also with the high electric current of 150 A, considerable increase of the battery temperature took place in any one of the Samples I to IV to such an extent that the maximum temperatures measured at the lead portions in each Sample which are representative of the internal temperature inside each storage battery reached a value exceeding 55° to 60° C. at which the discharge capacity would quickly decrease. In contrast thereto, the Invention has exhibited a minimized increase in battery temperature which did not reach the critical temperature and is, therefore, believed excellent in heat exchange efficiency.

The reason that the Invention has exhibited a better heat exchange efficiency than that exhibited by the Sample I in which no insulating cover is employed is believed because, as schematically shown in FIG. 15, the vent spaces 4 between the neighboring storage batteries and the vent perforations 15 in the insulating cover 16 are communicated in series with each other so that 40% or more of the air flows therethrough in contact with the connecting pieces 13 to thereby facilitate dissipation of heat from the connecting pieces and also to remove heat from the pole terminals and hence to remove heat generated inside the storage batteries.

As regards the Sample IV which utilizes the insulating cover similar to the insulating cover 16, but having the elongated vent perforations 15b defined at respective locations laterally offset relative to the adjacent connecting pieces, it appears that even though the amount of air supplied in the Sample IV remains the same, not only was the amount of air flowing in contact with and in the vicinity of the connecting pieces reduced considerably with its velocity lowered down to a value lower than that in the Invention because of the offset positioning of the elongated vent perforations 15b, but also the insulating cover appears to have provided an obstacle to diffusion of heat drifting in the vicinity of and above the connecting pieces. For this reason, the heat exchange efficiency exhibited by the Sample IV is lower than that exhibited by the Sample I.

It has also been found that the use of the vent holes 30 in the peripheral wall of each cap such as in the Sample II or in the opposite side walls of each elongated cap such as in the Sample III is still insufficient in accomplishing a sufficient ventilation, accompanied by a considerable increase in battery temperature.

In addition to the foregoing tests, a cycle test was also conducted 100 cycles at room temperature of 12° to 35° C., each cycle consisting of charging each of the Invention and Samples I to IV under the fast charging condition, allowing it to stand for an hour and operating it under a simulated load in which the storage battery assembly discharges an electric current within the range of 20 to 200 A. The simulated load referred to above represents a condition resembling to start, run and acceleration of an electric car. As a result of the cycle test, it has been found that the rate of reduction in discharge capacity of the Invention was not higher than 5% whereas that of the Samples I to IV ranged from 10 to 20% and that degrees of reduction in discharge capacity after the cycle test were substantially similar to the results tabulated in Table 1.

It is pointed out that even with the storage battery assembly having each storage battery of the design shown in FIGS. 20 and 21 and the storage battery assembly having each storage battery of the design shown in FIGS. 22 and 23 were also tested in the manner described above to find change in temperature during the charge and the discharge, both having exhibited a heat exchange efficiency similar to that exhibited by the Invention discussed above.

During the tests being conducted, the forced cooling system shown in FIG. 17 was employed. However, similar effects could be obtained even through the suction fan was employed in place of the blower 26 so that the cooling air could be drawn from bottom of the complete storage battery assembly and also even though the air cooling device 24 was installed below the storage battery assembly. It is, however, pointed out that where the storage battery assembly of the present invention is used on a mobile body such as, for example, an electric car, installation of the storage battery assembly should be fixed in consideration of the position of the center of gravity in the mobile body and/or of the layout of an exhaust system through which heat removed from the storage battery assembly can be vented to the atmosphere.

While the battery temperature increased a value higher than 10° C. when, without employing the forced air cooling system, a vent space was provided above the storage battery assembly so that heat can be vented by the effect of convection of ambient air, but the discharge effect exhibited thereby was substantially similar to that shown in Table 1, the single electrochemical cell or storage battery according to the present invention having exhibited a minimized increase in temperature and an excellent heat dissipating property.

In describing the preferred embodiments of the present invention, reference has been made to the use of the nickel-hydrogen storage battery tending to emit a relatively large amount of heat. However, any other alkaline storage battery such as, for example, the nickel-cadmium storage battery emits a relatively large amount of heat when used in the application where it is quickly charged and is required to discharge a relatively large amount of electric current, and therefore, will exhibit reduction in performance in a manner similar thereto. However, application of the present invention to any other alkaline storage battery results in increase in heat dissipating property and suppression of reduction in performance in a manner similar to that discussed in connection with the embodiment of the present invention.

As hereinbefore described, the present invention makes use of the insulating cover covering the connecting pieces on one hand and mounted on the storage battery assembly to integrate the individual storage batteries together. Accordingly, as is the case with the conventional monoblock storage battery assembly, the storage battery assembly can firmly secured to the support structure by the use of a fixing means such that the storage battery assembly will not be substantially deformed, twisted nor displaced with no substantial possibility of displacement of the individual storage batteries relative to each other.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A storage battery assembly comprising:
    a plurality of electrochemical cells,
        each of said electrochemical cells including a generally rectangular box shaped electrolyte vessel having an opening,
        an electrode structure accommodated within the electrolyte vessel and including positive electrode plates and negative electrode plates,
        a quantity of electrolyte accommodated within the electrolyte vessel, and
        a top lid enclosing the opening of the electrolyte vessel,
        each of said electrochemical cells also including pole terminals protruding outwardly from the respective top lid;
    said electrochemical cells being electrically connected in series with each other by means of generally elongated electroconductive connecting pieces,
    each of said electroconductive connecting pieces connecting one of the pole terminals of one electrochemical cell with the other of the pole terminals of the next adjoining electrochemical cell,
    each of said electrochemical cells being bundled in side-by-side fashion together in a row; and
    an insulating cover made of synthetic resin and having a plurality of vent perforations defined therein,
        said insulating cover being mounted on the bundled electrochemical cells so as to cover respective tops of the electrochemical cells with each of said vent perforations positioned substantially above a portion of the connecting pieces that overlays adjoining electrochemical cells.

2. The storage battery assembly according to claim 1, wherein each of said connecting pieces has a longitudinal axis and a width, and
    wherein each of said vent perforations is a slot having a longitudinal axis and also having a width, each vent perforation being defined in the insulating cover with the longitudinal axis thereof lying perpendicular to the longitudinal axis of the adjacent connecting piece, the width of said slot being chosen to be about 0.5 to about 2 times the width of the adjacent connecting piece.

3. The storage battery assembly according to claim 2, wherein the width of the slot is within the range of about 2 to about 7 mm.

4. The storage battery assembly according to claim 1, wherein said insulating cover has a top panel and a peripheral wall extending from a periphery of the top panel in a direction generally transverse to the top panel, both of said top panel and said peripheral wall having cutouts formed therein at respective locations substantially above the pole terminals of all of the electrochemical cells.

5. The storage battery assembly according to claim 1, wherein said insulating cover has a top panel and a peripheral wall extending from a periphery of the top panel in a direction generally transverse to the top panel, and
    wherein both of said top panel and said peripheral wall of the insulating cover has a wall thickness within the range of about 1 to about 4 mm.

6. The storage battery assembly according to claim 1 or 5, wherein said insulating cover has a top panel and a peripheral wall extending from a periphery of the top panel in a direction generally transverse to the top panel,
    wherein the top panel of the insulating cover is of a shape formed with recessed grooves continued from the peripheral wall of the insulating cover, and
    wherein said vent perforations are formed in the recessed grooves.

7. The storage battery assembly according to claim 4, wherein said insulating cover has a top panel and a peripheral wall extending from a periphery of the top panel in a direction generally transverse to the top panel, and wherein reinforcement ribs are formed at a junction between said top panel and said peripheral wall of the insulating cover.

8. The storage battery assembly according to claim 4, wherein said insulating cover has a top panel and a peripheral wall extending from a periphery of the top panel in a direction generally transverse to the top panel,
    wherein the peripheral wall of the insulating cover has a shoulder and a skirt defined therein, said skirt has an inner surface formed with a recess, and
    wherein one of the electrolyte vessels and the top lid thereof is formed with a projection engageable in said recess in the skirt, said insulating cover being mounted on the electrochemical cell by causing the shoulder to engage a top surface of said top lid and engaging the projection of said top lid in the recess in the skirt.

9. The storage battery assembly according to claim 4, wherein said insulating cover has a top panel and a peripheral wall extending from a periphery of the top panel in a direction generally transverse to the top panel, and
    wherein the insulating cover is capped onto the electrochemical cells by bonding the peripheral wall thereof to one of the top lids of the electrolyte vessels.

10. The storage battery assembly according to claim 9, wherein said insulating cover has a top panel and a peripheral wall extending from a periphery of the top panel in a direction generally transverse to the top panel, and wherein the insulating cover is capped onto the electrochemical cells by fusion bonding the peripheral wall thereof to one of the top lids of the electrolyte vessels.

11. The storage battery assembly according to claim 9,
wherein said insulating cover has a top panel and a peripheral wall extending from a periphery of the top panel in a direction generally transverse to the top panel, and
wherein the insulating cover is capped onto the electrochemical cells by fusion bonding the peripheral wall thereof to one of the top lids of the electrolyte vessels,
wherein the bonding is carried out by the use of a bonding agent.

12. A storage battery assembly comprising:
a plurality of electrochemical cells,
  each of said electrochemical cells including a generally rectangular box shaped electrolyte vessel having an opening,
  an electrode structure accommodated within the electrolyte vessel and including positive electrode plates and negative electrode plates,
  a quantity of electrolyte accommodated within the electrolyte vessel, and
  a top lid enclosing the opening of the electrolyte vessel,
  each of said electrochemical cells also including pole terminals protruding outwardly from the respective top lid,
  said electrochemical cells being electrically connected in series with each other by means of generally elongated electroconductive connecting pieces,
  each of said electroconductive connecting pieces connecting one of the pole terminals of one electrochemical cell with the other of the pole terminals of the next adjoining electrochemical cell,
  each of said electrochemical cells being bundled in side-by-side fashion together in a row;
an insulating cover made of synthetic resin and having a plurality of vent perforations defined therein,
  said insulating cover being mounted on the bundled electrochemical cells so as to cover respective tops of the electrochemical cells with each of said vent perforations positioned substantially above a portion of the connecting pieces that overlays adjoining electrochemical cells,
  wherein vent spaces are defined between the neighboring electrochemical cells; and
a ventilating means disposed above the insulating cover and below the bundled electrochemical cells for passing air through the vent spaces and also within interior of the insulating cover.

13. A storage battery assembly comprising:
a plurality of electrochemical cells,
  each of said electrochemical cells including a generally rectangular box shaped electrolyte vessel having an opening,
  an electrode structure accommodated within the electrolyte vessel and including positive electrode plates and negative electrode plates,
  a quantity of electrolyte accommodated within the electrolyte vessel, and
  a top lid enclosing the opening of the electrolyte vessel,
  each of said electrochemical cells also including pole terminals protruding outwardly from the respective top lid,
  said electrochemical cells being electrically connected in series with each other by means of generally elongated electroconductive connecting pieces,
  each of said electroconductive connecting pieces connecting one of the pole terminals of one electrochemical cell with the other of the pole terminals of the next adjoining electrochemical cell,
  each of said electrochemical cells being bundled in side-by-side fashion together in a row;
an insulating cover made of synthetic resin and having a plurality of vent perforations defined therein,
  said insulating cover being mounted on the bundled electrochemical cells so as to cover respective tops of the electrochemical cells with each of said vent perforations positioned substantially above a portion of the connecting pieces that overlays adjoining electrochemical cells;
a metallic plate sandwiched between the neighboring electrochemical cells; and
a ventilating means disposed above the insulating cover and laterally of the bundled electrochemical cells for ventilating an interior of the insulating cover.

14. A storage battery assembly comprising:
a plurality of electrochemical cells,
  each of said electrochemical cells including a generally rectangular box shaped electrolyte vessel having an opening,
  an electrode structure accommodated within the electrolyte vessel and including positive electrode plates and negative electrode plates,
  a quantity of electrolyte accommodated within the electrolyte vessel, and
  a top lid enclosing the opening of the electrolyte vessel,
  each of said electrochemical cells also including pole terminals protruding outwardly from the respective top lid,
  said electrochemical cells being electrically connected in series with each other by means of generally elongated electroconductive connecting pieces,
  each of said electroconductive connecting pieces connecting one of the pole terminals of one electrochemical cell with the other of the pole terminals of the next adjoining electrochemical cell,
  each of said electrochemical cells being bundled in side-by-side fashion together in a row;
an insulating cover made of synthetic resin and having a plurality of vent perforations defined therein,
  said insulating cover being mounted on the bundled electrochemical cells so as to cover respective tops of the electrochemical cells with each of said vent perforations positioned substantially above a portion of the connecting pieces that overlays adjoining electrochemical cells;
  wherein the electrolyte vessel and the top lid are made of metal; and
  wherein the insulating cover has a peripheral wall having vent holes defined therein; and
a ventilating means disposed above the insulating cover and laterally of the storage battery assembly for ventilating an interior of the insulating cover.

* * * * *